US011572733B1

(12) United States Patent
Eidam et al.

(10) Patent No.: US 11,572,733 B1
(45) Date of Patent: Feb. 7, 2023

(54) SMART TABLE WITH BUILT-IN LOCKERS

(71) Applicant: Wells Fargo Bank, N.A., San Francisco, CA (US)

(72) Inventors: Kourtney Eidam, Marietta, GA (US); Darren M. Goetz, Salinas, CA (US); Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 2 days.

(21) Appl. No.: 17/088,456

(22) Filed: Nov. 3, 2020

Related U.S. Application Data

(63) Continuation-in-part of application No. 17/079,958, filed on Oct. 26, 2020, now Pat. No. 11,397,956, and a continuation-in-part of application No. 17/079,961, filed on Oct. 26, 2020, and a continuation-in-part of application No. 17/079,971, filed on Oct. 26, 2020.

(51) Int. Cl.
*E05B 65/44* (2006.01)
*E05G 1/00* (2006.01)
*G07C 9/22* (2020.01)
*G07C 9/27* (2020.01)
*G07C 9/00* (2020.01)
(Continued)

(52) U.S. Cl.
CPC .............. *E05G 1/005* (2013.01); *G01G 19/52* (2013.01); *G06V 20/52* (2022.01); *G07C 9/00912* (2013.01); *G07C 9/22* (2020.01); *G07C 9/27* (2020.01); *G07C 2209/08* (2013.01)

(58) Field of Classification Search
CPC .. E05G 1/005; G07C 9/22; G07C 9/27; G07C 9/00912; G07C 2209/08; G06V 20/52; G01G 19/52
See application file for complete search history.

(56) References Cited

U.S. PATENT DOCUMENTS 6,430,542 B1   8/2002  Moran
6,493,469 B1  12/2002  Taylor et al.
(Continued)

FOREIGN PATENT DOCUMENTS

CN   107977776   5/2018
CN   108198076   6/2018
(Continued)

OTHER PUBLICATIONS

Cho et al.; Interaction for Tabletop Computing Environment an Analysis and Implementation 8 Pages.
(Continued)

*Primary Examiner* — Yong Hang Jiang
(74) *Attorney, Agent, or Firm* — Foley & Lardner LLP

(57) ABSTRACT

Systems and apparatuses for safety deposit box access using a smart table and a locker are described herein. A safety deposit box access system includes a smart table and a locker. The smart table includes a processing circuit configured to receive an appointment request from a customer user device. The processing circuit is further configured to authenticate the customer, verify the customer is authorized to access the safety deposit box, release the safety deposit box from the locker, measure the change in weight of the safety deposit box, lock the locker, and transmit a notification to the customer when the safety deposit box has been returned to the vault.

20 Claims, 16 Drawing Sheets

(51) Int. Cl.
*G01G 19/52* (2006.01)
*G06V 20/52* (2022.01)

(56) References Cited

U.S. PATENT DOCUMENTS

| | | | |
|---|---|---|---|
| 6,667,738 | B2 | 12/2003 | Murphy |
| 6,866,388 | B2 | 3/2005 | Yang |
| 7,027,040 | B2 | 4/2006 | Rekimoto et al. |
| 7,403,191 | B2 | 7/2008 | Sinclair |
| 8,194,045 | B1 | 6/2012 | Maloney et al. |
| 8,195,576 | B1 | 6/2012 | Grigg et al. |
| 8,206,047 | B1 | 6/2012 | Isaac et al. |
| 8,207,872 | B2 | 6/2012 | Huang et al. |
| 8,346,672 | B1 | 1/2013 | Weiner et al. |
| 8,356,712 | B2 | 1/2013 | Piazza, Jr. |
| 8,438,110 | B2 | 5/2013 | Calman et al. |
| 8,451,248 | B1 | 5/2013 | Kim |
| 8,502,789 | B2 | 8/2013 | Tse et al. |
| 8,549,589 | B2 | 10/2013 | Stollman |
| 8,700,772 | B2 | 4/2014 | Saint Clair |
| 8,743,072 | B2 | 6/2014 | Kim |
| 8,854,330 | B1 | 10/2014 | Maloney et al. |
| 9,024,884 | B2 | 5/2015 | Lengeling et al. |
| 9,075,429 | B1 | 7/2015 | Karakotsios |
| 9,104,886 | B1 | 8/2015 | Dolbakian et al. |
| 9,141,280 | B2 | 9/2015 | Van Eerd et al. |
| 9,292,129 | B2 | 3/2016 | Tsang et al. |
| 9,411,467 | B2 | 8/2016 | Argiro |
| 9,430,140 | B2 | 8/2016 | Reuschel et al. |
| 9,529,514 | B2 | 12/2016 | Saint Clair |
| 9,560,076 | B2 | 1/2017 | Schultz et al. |
| 9,576,105 | B2 | 2/2017 | Cho |
| 9,588,680 | B2 | 3/2017 | Van Eerd et al. |
| 9,590,968 | B2 | 3/2017 | Stollman |
| 9,665,259 | B2 | 5/2017 | Lee et al. |
| 9,715,476 | B2 | 7/2017 | Megiddo et al. |
| 9,746,981 | B2 | 8/2017 | Zachut et al. |
| 9,747,499 | B2 | 8/2017 | Kim et al. |
| 9,749,395 | B2 | 8/2017 | Dawson et al. |
| 9,769,216 | B2 | 9/2017 | Gaetano, Jr. |
| 9,774,653 | B2 | 9/2017 | Hinckley et al. |
| 9,794,306 | B2 | 10/2017 | Riecken et al. |
| 9,883,138 | B2 | 1/2018 | Chen et al. |
| 9,898,663 | B2 | 2/2018 | Wexler et al. |
| 9,924,019 | B2 | 3/2018 | Jeganathan et al. |
| 9,953,479 | B1 * | 4/2018 | Sawant .................. G07F 9/001 |
| 9,990,814 | B1 | 6/2018 | Eidam et al. |
| 10,055,046 | B2 | 8/2018 | Lengeling et al. |
| 10,096,011 | B2 | 10/2018 | Camp |
| 10,230,844 | B1 | 3/2019 | Ellis et al. |
| 10,262,509 | B1 | 4/2019 | Kourtney et al. |
| 10,332,200 | B1 | 6/2019 | Fournier et al. |
| 10,367,912 | B2 | 7/2019 | Saint Clair |
| 10,484,437 | B2 | 11/2019 | Banyai et al. |
| 10,485,341 | B2 * | 11/2019 | Dash ...................... A47B 31/02 |
| 10,540,014 | B1 | 1/2020 | Gribetz et al. |
| 10,565,643 | B2 | 2/2020 | Rohn et al. |
| 10,567,481 | B2 | 2/2020 | Dawson et al. |
| 10,579,228 | B2 | 3/2020 | Vida et al. |
| 10,614,219 | B2 | 4/2020 | Knapp et al. |
| 10,891,688 | B1 | 1/2021 | Clausen et al. |
| 10,970,549 | B1 * | 4/2021 | Krishnan ............. G06V 20/20 |
| 11,195,355 | B1 * | 12/2021 | Goetz ............... G07C 9/00309 |
| 2001/0037287 | A1 | 11/2001 | Broadbent et al. |
| 2002/0070964 | A1 | 6/2002 | Botz et al. |
| 2003/0069828 | A1 | 4/2003 | Blazey et al. |
| 2003/0108241 | A1 | 6/2003 | Colmenarez et al. |
| 2004/0075642 | A1 | 4/2004 | Kisliakov |
| 2004/0233216 | A1 | 11/2004 | Rekimoto et al. |
| 2005/0178074 | A1 * | 8/2005 | Kerosetz ................ A47F 9/02 52/27 |
| 2005/0185825 | A1 | 8/2005 | Hoshino et al. |
| 2005/0269404 | A1 * | 12/2005 | Landwirth ......... G07F 17/105 235/382 |
| 2005/0289045 | A1 | 12/2005 | Lawson |
| 2006/0101508 | A1 * | 5/2006 | Taylor .................... G07C 9/37 340/5.82 |
| 2007/0296545 | A1 | 12/2007 | Clare |
| 2007/0296579 | A1 * | 12/2007 | Mayer ............... G06Q 10/0837 340/567 |
| 2007/0300307 | A1 | 12/2007 | Duncan |
| 2009/0056599 | A1 | 3/2009 | Turner et al. |
| 2009/0174673 | A1 | 7/2009 | Ciesla |
| 2009/0315830 | A1 | 12/2009 | Westerman |
| 2010/0062811 | A1 | 3/2010 | Park et al. |
| 2010/0238119 | A1 | 9/2010 | Dubrovsky et al. |
| 2010/0302168 | A1 | 12/2010 | Giancarlo et al. |
| 2011/0035695 | A1 | 2/2011 | Fawcett et al. |
| 2011/0256019 | A1 | 10/2011 | Gruen et al. |
| 2011/0260976 | A1 | 10/2011 | Larsen et al. |
| 2012/0032783 | A1 | 2/2012 | Ahn et al. |
| 2012/0119999 | A1 | 5/2012 | Harris |
| 2012/0204116 | A1 | 8/2012 | Patil et al. |
| 2012/0204117 | A1 | 8/2012 | Patil et al. |
| 2013/0249947 | A1 | 9/2013 | Reitan |
| 2014/0012754 | A1 | 1/2014 | Hanson et al. |
| 2014/0168107 | A1 | 6/2014 | Kim |
| 2015/0020191 | A1 | 1/2015 | Vida et al. |
| 2015/0059002 | A1 | 2/2015 | Balram et al. |
| 2015/0109099 | A1 | 4/2015 | Birkel et al. |
| 2015/0135101 | A1 | 5/2015 | Ellis et al. |
| 2015/0221035 | A1 | 8/2015 | Anderson et al. |
| 2015/0278534 | A1 | 10/2015 | Thiyagarajan et al. |
| 2015/0279310 | A1 | 10/2015 | Itakura et al. |
| 2016/0034901 | A1 | 2/2016 | Ferren |
| 2016/0037346 | A1 | 2/2016 | Boettcher et al. |
| 2016/0071224 | A1 | 3/2016 | Huang |
| 2016/0180614 | A1 | 6/2016 | Micali et al. |
| 2016/0191576 | A1 | 6/2016 | Thompson et al. |
| 2017/0099453 | A1 | 4/2017 | Junuzovic et al. |
| 2017/0103440 | A1 | 4/2017 | Xing et al. |
| 2017/0115742 | A1 | 4/2017 | Xing et al. |
| 2017/0118645 | A1 | 4/2017 | Zarakas et al. |
| 2017/0169506 | A1 | 6/2017 | Wishne et al. |
| 2017/0180336 | A1 | 6/2017 | Josephson et al. |
| 2017/0227938 | A1 | 8/2017 | Wexler et al. |
| 2017/0278358 | A1 | 9/2017 | Ino et al. |
| 2017/0356218 | A1 * | 12/2017 | Beasley .................. G07C 9/35 |
| 2018/0041493 | A1 * | 2/2018 | Wilkinson .......... G07F 17/0014 |
| 2018/0060812 | A1 * | 3/2018 | Robinson ........... G06Q 10/1093 |
| 2018/0089349 | A1 | 3/2018 | Rezgui |
| 2018/0096386 | A1 | 4/2018 | Aggarwal et al. |
| 2018/0101985 | A1 | 4/2018 | Jones-McFadden et al. |
| 2018/0108207 | A1 | 4/2018 | Lyons et al. |
| 2018/0122187 | A1 | 5/2018 | Moore et al. |
| 2018/0268747 | A1 | 9/2018 | Braun |
| 2018/0293087 | A1 | 10/2018 | Lee et al. |
| 2018/0301111 | A1 | 10/2018 | Park et al. |
| 2018/0328099 | A1 * | 11/2018 | Whitaker ................ E05F 15/41 |
| 2018/0356885 | A1 | 12/2018 | Ross et al. |
| 2018/0357850 | A1 | 12/2018 | Moore et al. |
| 2019/0019011 | A1 | 1/2019 | Ross et al. |
| 2019/0034895 | A1 | 1/2019 | Camp |
| 2019/0108524 | A1 | 4/2019 | Nicholson et al. |
| 2019/0114585 | A1 * | 4/2019 | Fee ........................ G06Q 20/00 |
| 2019/0121522 | A1 | 4/2019 | Davis et al. |
| 2019/0228494 | A1 | 7/2019 | Stasi et al. |
| 2019/0228609 | A1 | 7/2019 | Nguyen et al. |
| 2019/0268321 | A1 | 8/2019 | Kim et al. |
| 2019/0306709 | A1 | 10/2019 | Kim et al. |
| 2019/0328339 | A1 | 10/2019 | Gujral et al. |
| 2019/0360259 | A1 | 11/2019 | Green et al. |
| 2020/0034106 | A1 | 1/2020 | Jain et al. |
| 2020/0056418 | A1 | 2/2020 | Dobbins et al. |
| 2020/0064960 | A1 | 2/2020 | Munemoto |
| 2020/0066079 | A1 | 2/2020 | Swaine et al. |
| 2020/0187694 | A1 * | 6/2020 | Santangeli ......... G07C 9/00571 |
| 2020/0218493 | A1 | 7/2020 | Sim et al. |
| 2020/0301720 | A1 | 9/2020 | Choi |

FOREIGN PATENT DOCUMENTS

| | | |
|---|---|---|
| CN | 108255462 | 7/2018 |
| CN | 109471687 | 3/2019 |

(56) References Cited

FOREIGN PATENT DOCUMENTS

| CN | 109983491 | 7/2019 |
| KR | 2019002815 A | 1/2019 |
| WO | WO-2019/019743 | 1/2019 |
| WO | WO-2019/098992 | 5/2019 |

OTHER PUBLICATIONS

Dani Deahl, This All-In-One Smart Desk Has Three Screens and a Built-In Scanner; Jun. 25, 2018. 2 Pages.
Scott Cary; How Capital One Taught Amazon's Alexa Ai Assistant to Help You Manage Your Money. Nov. 30, 2016; 4 Pages.

* cited by examiner

SMART TABLE WITH BUILT-IN LOCKERS

CROSS-REFERENCE TO RELATED APPLICATIONS

This application is a continuation-in-part of U.S. patent application Ser. No. 17/079,971 filed Oct. 26, 2020, a continuation-in-part of U.S. patent application Ser. No. 17/079,961 filed Oct. 26, 2020, and a continuation-in-part of U.S. patent application Ser. No. 17/079,958 filed Oct. 26, 2020, each of which are incorporated herein by reference in their entirety.

TECHNICAL FIELD

The present disclosure relates generally to the use of a smart table to improve efficiency and ease of conducting transactions at a provider location associated with a provider. More specifically, the present application relates to systems and methods for utilizing a smart table with built-in lockers to securely and efficiently access safety deposit boxes.

BACKGROUND

Customers of a provider are able to access a variety of services through software applications, such as mobile applications on user devices, to perform various tasks. For example, customers may use an internet enabled application to conduct transactions, change settings, and carry out other actions related to a customer account or with respect to a product offered by the provider. However, certain transactions and tasks may require a customer to visit a provider location (e.g., due to security, needing to meet with a provider representative).

SUMMARY

One example embodiment relates to a safety deposit box access system associated with a provider, the safety deposit box access system comprising a locker and a smart table. The locker comprising a compartment configured to receive contents, a door, and a lock. The door being coupled to the compartment and configured to contain the contents within the compartment. The door being openable to allow access to the compartment. The lock being coupled to at least one of the door or the compartment and selectively actuatable between a locked position to prevent the door from opening and an unlocked position to allow the door to open. The smart table being communicably coupled to the locker and comprising a network interface and a processing circuit. The network interface configured to facilitate data communication with a plurality of user devices via a network. The processing circuit comprising a processor and a memory, the processing circuit configured to receive an appointment request from a customer user device including a time of a requested appointment, a location of the requested appointment, and a safety deposit box to be accessed by a customer associated with the customer user device during the requested appointment. The processing circuit further configured to authenticate the customer during the requested appointment. The processing circuit further configured to verify that the customer is authorized to access the safety deposit box based on the customer being authenticated. The processing circuit further configured to actuate the lock of the locker to the unlocked position upon verification that the customer is authorized to access the safety deposit box. The processing circuit further configured to actuate the lock of the locker upon the safety deposit box being returned to the compartment of the locker. The processing circuit further configured to transmit a notification to the customer user device upon the safety deposit box being returned to the vault.

Another example embodiment relates to a safety deposit box access system associated with a provider, the safety deposit box access system comprising a plurality of lockers and a smart table. Each locker of the plurality of lockers comprising a compartment configured to receive contents, a door, and a lock. The door being coupled to the compartment and configured to contain the contents within the compartment. The door being openable to allow access to the compartment. The lock being coupled to at least one of the door or the compartment and selectively actuatable between a locked position to prevent the door from opening and an unlocked position to allow the door to open. The smart table being communicably coupled to the plurality of lockers, comprising a network interface and a processing circuit, the network interface configured to facilitate data communication with a plurality of user devices via a network, the processing circuit comprising a processor and a memory. The processing circuit configured to receive an appointment request from a customer user device of a customer including a time of a requested appointment, a location of the requested appointment, and an indication of an item for deposit into a safety deposit box. The processing circuit being further configured to authenticate the customer during the requested appointment. The processing circuit being further configured to identify a locker from the plurality of lockers for the customer to temporarily store the item for deposit based on the appointment request. The processing circuit being further configured to actuate the lock of the locker to the unlocked position. The processing circuit being further configured to determine that the item for deposit has been placed into the compartment of the locker and the door has been closed. The processing circuit being further configured to actuate the lock of the locker to the locked position based on determining that the item has been placed into the locker and the door has been closed. The processing circuit being further configured to transmit a notification to the employee user device including instructions to transfer the item for deposit from the locker to the safety deposit box.

An additional example embodiment relates to a smart table, the smart table comprising a touch screen, a plurality of interactive surface sensors, a network interface, a plurality of lockers, and a processing circuit. The network interface being configured to facilitate data communication with a plurality of user devices via a network. Each locker of the plurality of lockers comprising a compartment configured to receive contents, a door, and a lock. The door being coupled to the compartment and configured to contain the contents within the compartment. The door being openable to allow access to the compartment. The lock being coupled to at least one of the door or the compartment and selectively actuatable between a locked position to prevent the door from opening and an unlocked position to allow the door to open. The processing circuit comprising a processor and a memory, the processing circuit configured to identify a locker of the plurality of lockers to be used by a customer to access the safety deposit box of the customer. The processing circuit further configured to authenticate the customer. The processing circuit further configured to provide access to the locker based on the customer being authenticated.

These and other features, together with the organization and manner of operation thereof, will become apparent from the following detailed description when taken in conjunction with the accompanying drawings.

It will be recognized that the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems and methods for accessing a safety deposit box, also known as a safe deposit box, using a smart table 106 with a locker bay 1302 are shown and described. The systems and methods described herein enhance safety deposit access procedures by utilizing a smart table 106 with a locker bay 1302.

For example, the smart table 106 authenticates the customer prior to accessing the safety deposit box, increasing the safety of deposited items. The safety deposit box access system further weighs the safety deposit boxes prior to customer access and after creating an audit trail that ensures any deposits or withdrawals are accounted for.

The embodiments of the safety deposit box deposit system described herein improve current item deposit procedures by performing steps that cannot be done by a conventional safety deposit box system. For example, the safety deposit box deposit system can authenticate the customer and determine that the customer does not have a safety deposit box at the branch. The system can proceed to dynamically assign an unassigned safety deposit box by analyzing current locker 1304 inventory and future appointments to access a safety deposit box, or items from a safety deposit box. Further, a customer can easily drop off the items for deposit and be notified when the items have been brought to the vault to be added to the safety deposit box.

Figure 1A:
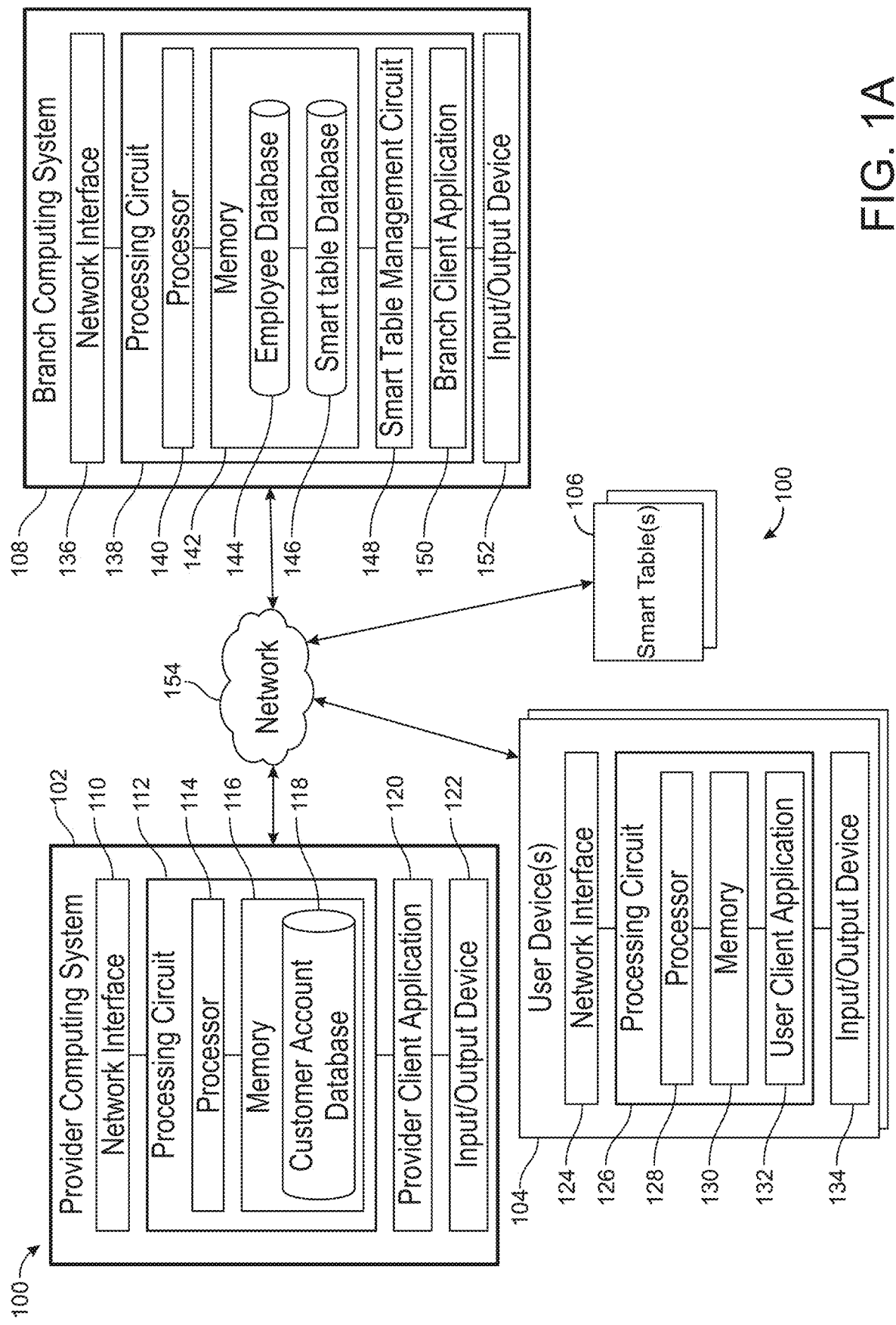
FIG. 1A is a block diagram of a smart table system including a provider computing system and a smart table, according to example embodiments.

Referring to FIG. 1A, a block diagram of a smart table system 100 is shown, according to potential embodiments. The smart table system 100 includes a provider computing system 102 associated with a provider, such as a service provider, bank, or financial institution. The smart table system 100 further includes one or more user devices (e.g., user device 104), one or more smart tables (e.g., smart table 106), and a branch computing system 108 (e.g., a computing system of a branch location of the FI). In some embodiments, the provider computing system 102, user device 104 (as well as any additional user devices), smart table 106 (and any additional smart tables), and branch computing system 108 are directly communicably coupled. In some embodiments, the components of smart table system 100 may be communicably and operatively coupled to each other over a network, such as network 154, that permits the direct or indirect exchange of data, values, instructions, messages, and the like (represented by the double-headed arrows in FIG. 1). The network 154 may include one or more of a cellular network, the Internet, Wi-Fi™, Wi-Max™, a proprietary provider network, a proprietary retail or service provider network, and/or any other kind of wireless or wired network.

Each system or device in smart table system 100 may include one or more processors, memories, network interfaces and user interfaces. The memory may store programming logic that, when executed by the processor, controls the operation of the corresponding computing system or device. The memory may also store data in databases. For example, memory 142 may store programming logic that when executed by processor 140 within processing circuit 138, causes employee database 144 to update information for an employee account with communications received from a user device 104. The network interfaces (e.g., network interface 110 of provider computing system 102) may allow the computing systems and devices to communicate wirelessly or otherwise. The various components of devices in smart table system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

The provider computing system 102 may be managed by a provider, such as a credit card issuer, a consultant, a retailer, a service provider, and/or the like. The provider computing system 102 includes a network interface 110, a processing circuit 112, and an input/output device 122. The network interface 110 is structured and used to establish connections with other computing systems and devices (e.g., the user devices 104, the smart tables 106, the branch computing system 108, etc.) via the network 154. The network interface 110 includes program logic that facilitates connection of the provider computing system 102 to the network 154. For example, the network interface 110 may include any combination of a wireless network transceiver (e.g., a cellular modem, a Bluetooth™ transceiver, a Wi-Fi™ transceiver, etc.) and/or a wired network transceiver (e.g., an Ethernet transceiver). In some arrangements, the network interface 110 includes the hardware and machine-readable media sufficient to support communication over multiple channels of data communication. Further, in some arrangements, the network interface 110 includes cryptography capabilities to establish a secure or relatively secure communication session in which data communicated over the session is encrypted.

The processing circuit 112 includes a processor 114, a memory 116, and a provider client application 120. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 116 (e.g., customer account database 118). One such application may be the provider client application 120.

The memory 116 may store a customer account database 118, according to some embodiments. The customer account database 118 may be configured to store updated personal information for customer accounts associated with the provider (e.g., the FI). For example, the customer account database 118 saves personal user information, such as name, age, gender, address, education, occupation, etc., customer preferences, such as notification preferences, security preferences, etc., and authentication information, such as customer passwords, biometric data for the customer, geometric information (e.g., latitude, longitude), etc. In some embodiments, the customer account database 118 includes a token vault that stores an associated customer token and/or device token for each customer account. The customer account database 118 may further be configured to store financial data for each customer account, such as past transactions, different provider account information (e.g., balances, debt, type of account, etc.), investments, loans, mortgages, and so on.

In some embodiments, the provider client application 120 may be incorporated with an existing application in use by the provider computing system 102 (e.g., a mobile provider application, a service provider application, etc.). In other embodiments, the provider client application 120 is a separate software application implemented on the provider computing system 102. The provider client application 120 may be downloaded by the provider computing system 102 prior to its usage, hard coded into the memory 116 of the provider computing system 102, or be a network-based or web-based interface application such that the provider computing system 102 may provide a web browser to access the application, which may be executed remotely from the provider computing system 102. Accordingly, the provider computing system 102 may include software and/or hardware capable of implementing a network-based or web-based application. For example, in some instances, the provider client application 120 includes software such as HTML, XML, WML, SGML, PHP (Hypertext Preprocessor), CGI, and like languages.

In the latter instance, a user (e.g., a provider employee) may have to log onto or access the web-based interface before usage of the application. In this regard, the provider client application 120 may be supported by a separate computing system (e.g., user device 104) including one or more servers, processors, network interface, and so on, that transmit applications for use to the provider computing system 102.

In certain embodiments, the provider client application 120 includes an application programming interface (API) and/or a software development kit (SDK) that facilitate the integration of other applications with the provider client application 120. For example, the provider client application 120 is configured to utilize the functionality of the branch computing system 108 by interacting with the branch client application 150 through an API.

Still referring to FIG. 1, the input/output device 122 is structured to receive communications from and provide communications to provider employees associated with the provider computing system 102. The input/output device 122 is structured to exchange data, communications, instructions, etc. with an input/output component of the provider computing system 102. In one embodiment, the input/output device 122 includes communication circuitry for facilitating the exchange of data, values, messages, and the like between the input/output device 122 and the components of the provider computing system 102. In yet another embodiment, the input/output device 122 includes machine-readable media for facilitating the exchange of information between the input/output device and the components of the provider computing system 102. In yet another embodiment, the input/output device 122 includes any combination of hardware components, communication circuitry, and machine-readable media.

In some embodiments, the input/output device 122 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 122 may provide an interface for the user to interact with various applications (e.g., the provider client application 120) stored on the provider computing system 102. For example, the input/output device 122 includes a keyboard, a keypad, a mouse, joystick, a touch screen, a microphone, a biometric device, a virtual reality headset, smart glasses, and the like. As another example, input/output device 122, may include, but is not limited to, a television monitor, a computer monitor, a printer, a facsimile, a speaker, and so on.

The branch computing system 108 similarly includes a network interface 136, a processing circuit 138, and an input/output device 152. The network interface 136, the processing circuit 138, and the input/output device 152 may function substantially similar to and include the same or similar components as the components of provider computing system 102, such as the network interface 110, the processing circuit 112, and the input/output device 122, described above. As such, it should be understood that the description of the network interface 110, the processing circuit 112, and the input/output device 122 of the provider computing system 102 provided above may be similarly applied to the network interface 136, the processing circuit 138, and the input/output device 152 of the branch computing system 108.

For example, the network interface 136 is similarly structured and used to establish connections with other computing systems (e.g., the provider computing system 102, the user devices 104, and/or the smart tables 106) via the network 154. The network interface 136 may further include any or all of the components discussed above, with reference to the network interface 110.

The processing circuit 138 similarly includes a processor 140 and a memory 142. The processor 140 and the memory 142 are substantially similar to the processor 114 and the memory 116 described above, with reference to the provider computing system 102. In some embodiments, the memory 142 includes an employee database 144 and a smart table database 146. The employee database 144 may be structured to store data concerning each employee associated with the branch location. In some embodiments, the employee database 144 may store data regarding an identification number, a job position, authorization information, contact information, a schedule, customer history, work history, an associated user device 104, credentials, and so forth, of an employee that works at the branch location associated with the branch computing system 108. For example, the employee database 144 may save biometric information (e.g., a fingerprint scan, an eye scan, a voice memo, etc.) and a password (e.g., PIN, alphanumeric code, QR code, barcode, etc.) for each employee at the branch location. As another example, the employee database 144 stores security and data access rights for each employee that are utilized in conducting particular transactions (high-risk transactions, transactions with high-confidentiality customers, etc.).

Additionally, the employee database 144 may include the types of trainings each employee has received, the clearances (e.g., access) that each employee has obtained, a trustworthiness score for each employee, and any other pertinent information pertaining to each employee that may be used to determine the employees qualifications for performing various transactions and other tasks using a smart table 106.

The smart table database 146 may be structured to store data for each smart table 106 at the branch location. The smart table database 146 may save information regarding an identification number of each smart table 106, service history information (e.g., a last date a smart table was serviced for repairs and/or updates), transaction history information (e.g., number of customers that used the smart table 106), scheduling information (e.g., customers assigned to the smart table 106 for an upcoming smart table provider session, and/or power status (e.g., charging, operating on a low battery level, etc.). For example, the smart table database 146 may store a schedule of which customers will be using a particular smart table 106 at the branch location. Beneficially, this may allow for branch managers to more effectively plan out smart table provider sessions and decrease the likelihood of scheduling conflicts, such as two customers having conflicting sessions at the same smart table 106.

The processing circuit 138 also is shown to include a smart table management circuit 148. In some embodiments, the smart table management circuit 148 is configured to receive new data (e.g., from the network 154) relating to employees and smart tables 106 at a branch location. The smart table management circuit 148 may then update a correct, corresponding database (e.g., employee database 144 or smart table database 146). In some embodiments, the smart table management circuit 148 is configured to receive requests from customers for an appointment at a smart table 106. The smart table management circuit 148 may then schedule the appointment based on what the client wants to accomplish during the provider session (e.g., to ensure the assigned smart table 106 has the necessary capabilities, such as a functional cash dispenser, credit card printer, check depositor, biometric authenticator, and so on) and the available smart tables 106 during a time slot desired by the customer.

The smart table management circuit 148 may also be configured to identify which employees may be needed (e.g., based on experience and/or access) at a smart table 106 in order to conduct a planned transaction with a customer during a provider session. For example, in generating a request for a smart table provider session, a customer may be asked (e.g., via the user device 104 associated with the customer) what type of transaction or provider task does the customer want to complete during the smart table session. In some embodiments, the smart table management circuit 148 may generate and transmit a notification to user device 104 of an employee that a new smart table provider session, assigned to the employee, has been scheduled.

Although the employee database 144, smart table database 146, and smart table management circuit 148 are shown as being a part of the branch computing system 108, these components may alternatively be a part of the provider computing system 102 and/or integrated into one or more smart tables 106. In other embodiments, each of the provider computing system 102 and the branch computing system 108 may include a corresponding smart table management circuit the same as or similar to the smart table management circuit 148.

The branch computing system 108 is similarly structured as the provider computing system 102 to run a variety of application programs and store associated data in a database of the memory 142. One such application may be the branch client application 150, for example.

The branch client application 150 may be substantially similar to the provider client application 120, but may instead be tailored toward branch employees or a branch manager at the branch location. For example, branch client application 150 is structured to generate user interfaces to display on a smart table 106 to facilitate improved customer experiences and employee interactions during an established provider session. Particularly, the branch client application 150 is configured to communicate with the provider computing system 102, the user devices 104 (e.g., customer user devices and employee user devices), and smart tables 106 to receive instructions or documents from the provider computing system 102 and/or the branch computing system 108 to complete specific tasks during a provider session at a smart table 106. Furthermore, the branch client application 150 may be configured to communicate reminders to user devices 104 of employees regarding upcoming provider sessions at a smart table 106 and/or ongoing provider sessions at a smart table 106 to perform a task associated with the provider session. For example, the branch client application 150 may be configured to generate a reminder for a branch employee to prepare a smart table 106 for an upcoming provider session. Accordingly, the branch client application 150 is communicably coupled to the provider computing system 102 (e.g., through interactions with the provider client application 120), the user devices 104 (e.g., through interactions with the user client application 132), and the smart tables 106 (e.g., through interactions with the smart table client application 218 (FIG. 2)).

The branch client application 150 may thus communicate with the provider computing system 102, the user device 104, and the smart tables 106 to perform a variety of functions. For example, the branch client application 150 is configured to reset a display of a smart table 106 (e.g., reset a display to a generic welcome display or sleep mode display) at the end of a provider session with a customer. As such, the branch client application 150 allows for a branch manager and branch employees associated with the branch location to monitor and update user interfaces of the smart tables 106 before, during, and after provider sessions with one or more customers paired to one of the smart tables 106.

The input/output device 152 may function substantially similarly to and include the same or similar components as the input/output device 122 described above, with reference to the provider computing system 102. Accordingly, it will be understood that the description of the input/output device 122 described above may also be applied to the input/output device 152 of the branch computing system 108. As an example, the input/output device 152 is similarly structured to receive communications from and provide communications to user devices 104 of branch employees and/or the branch manager associated with the branch computing system 108.

The smart table system 100 also includes one or more user devices 104, according to some embodiments. The user devices 104 may be a variety of suitable user computing devices. For example, the user devices 104 may comprise mobile phones. In other embodiments, the user devices 104 include personal computers (e.g., desktop computers or laptop computers), tablets, smart watches or other wearable devices (e.g., rings, jewelry, headsets, bands), smart glasses, headphones, smart vehicle voice/touch command systems, virtual/augmented reality (VR/AR) systems (e.g., smart glasses), appliances, internet of things (IoT) devices, voice assistants, at-home touch screen display systems, and/or any other suitable user computing devices capable of accessing and communicating using local and/or global networks (e.g., the network 154). The user devices 104 may be associated with employees or with customers of the provider (e.g., customers at the FI). As such, the customer account database 118 may be further configured to store device information concerning each user device 104 associated with a customer of the provider. Similarly, the employee database 144 may be further configured to store device information pertaining to each user device 104 of an employee at a branch location. For example, the device information may include a device form (e.g., the type of user device 104), a set of device capabilities (e.g., types of input/output devices, device mobility, operating system, installed applications, camera capabilities, device communication capabilities, and so on), device location information (e.g., geolocation data such as, latitude and longitude information), and/or device identification and authentication information (e.g., an encrypted device token for each user device 104, user authentication information, such as a PIN or biometric data, associated with each user device 104, etc.).

The user devices 104 may each similarly include a network interface 124, a processing circuit 126, and an input/output device 134. The network interface 124, the processing circuit 126, and the input/output device 134 may be structured and function substantially similar to and include the same or similar components as the network interface 110, the processing circuit 112, and the input/output device 122 described above, with reference to the provider computing system 102. Therefore, it should be understood that the description of the network interface 110, the processing circuit 112, and the input/output device 122 of the provider computing system 102 provided above may be similarly applied to the network interface 124, the processing circuit 126, and the input/output device 134 of each of the user devices 104.

In some embodiments, the network interface 124 is similarly structured and used to establish connections with other computing systems (e.g., the provider computing system 102, the branch computing system 108, other user devices 104, and the smart tables 106) via the network 154. The network interface 124 may further include any or all of the components discussed above, with reference to the network interface 110.

The processing circuit 126 similarly includes a memory 130 and a processor 128. The memory 130 and the processor 128 are substantially similar to the memory 116 and the processor 114 described above. Accordingly, the user devices 104 are similarly configured to run a variety of application programs and store associated data in a database of the memory 130 (e.g., user device database 131). For example, the user devices 104 may be configured to run an application such as the user client application 132 that is stored in the user device database 131. In another example, the user devices 104 may be configured to store various user data, such as, but not limited to, personal user device information (e.g., names, addresses, phone numbers, contacts, call logs, installed applications, and so on), user device authentication information (e.g., username/password combinations, device authentication tokens, security question answers, unique client identifiers, biometric data (such as digital representations of biometrics), geographic data, social media data, application specific data, and so on), and user device provider information (e.g., token information, account numbers, account balances, available credit, credit history, exchange histories, and so on) relating to the various accounts.

The user client application 132 may be substantially similar to the provider client application 120, the branch client application 150, and the smart table client application 218 (FIG. 2), but may instead be specifically tailored to the user associated with the user devices 104. For example, the user client application 132 is similarly structured to selectively provide displays and/or audio/visual communications to each user device 104 to allow for improved interactions between a customer and branch employees, branch managers, and provider employees.

Particularly, the user client application 132 is configured to communicate with the provider computing system 102, the branch computing system 108, and the smart tables 106 to facilitate user interactions with a smart table 106 during a provider session at a branch location. As such, the user devices 104 are communicably coupled to the provider computing system 102 (e.g., through interactions with the provider client application 120), the branch computing system 108 (e.g., through interactions with the branch client application 150), and the smart tables 106 (e.g., through interactions with the smart table client application 218 (FIG. 2)).

The user client application 132 may therefore communicate with the provider computing system 102, the smart tables 106, and the branch computing system 108 to perform a variety of functions. For example, the user client application 132 is similarly configured to receive user inputs (e.g., via a user interface of the user device 104) to complete provider interactions during a user session with a smart table 106, depending on whether the individual associated with the user device 104 is an employee or a customer. Additionally, the user client application 132 is configured to output information to a display of the user device 104 regarding information on the provider interaction. For example, the user client application 132 is configured to generate a user interface to show graphics regarding a financial history of a customer.

The user client application 132 is further configured to allow for communication with the provider client application 120 to allow a user associated with the various user devices 104 to update account information and/or provide feedback during a provider session with a smart table 106. Accordingly, the user client application 132 facilitates effective communication with a branch manager, other branch employees, the provider employees, and/or other customers (e.g., during a provider session with two customers, such as a mother and daughter) during a connected session with a smart table 106.

The user client application 132 may also be structured to allow the user devices 104 to retrieve and submit documents, forms, and/or any type of necessary information to and/or from a smart table 106 during an established session, as required to complete certain financial tasks. In some instances, the user client application 132 may be configured to automatically retrieve and/or submit documents, forms, or other necessary information to and/or from a smart table 106 in response to the establishment of a secure connection to the smart table 106. In some embodiments, the user client application 132 may be configured to temporarily store the various documents, forms, and/or necessary information, which may then be selectively transmitted to the smart table 106 in response to a user input from a customer or employee (e.g., received via the input/output device 134).

In some embodiments, the user client application 132 may be configured to temporarily store the various documents, forms, and/or necessary information and then selectively transmit the various documents, forms, and/or necessary information to the smart table 106 in response to a customer's arrival at a branch location. For example, the user device 104 may automatically connect to the branch computing system 108 and/or the one or more smart tables 106 when the user device 104 is within range of a network or communication device associated with the branch computing system 108 and/or the one or more smart tables 106.

In some embodiments, a customer or employee may identify various levels of authority associated with each of the user devices 104. For example, in some implementations, a user may set a first user device 104 as a primary user device and a second user device 104 as a secondary user device. In some instances, there may be various approved users of the user devices 104, excluding the user, such as family members, caretakers, business partners for customers, or other branch employees, a branch manager, a supervising employee for employees at the branch location. As such, in some embodiments, a primary user device may have the authority to veto or cancel the actions taken by a secondary user device.

Furthermore, the user client application 132 may be configured to provide a device status for each user device 104 to the provider session management circuit 210 (FIG. 2) of a smart table 106. The device status may include both a device location and an indication of whether the respective user device 104 is active (e.g., turned on, connected to the internet, active notifications, within a specific distance, communicating with a beacon, currently used, any combination, and so on). For example, the user client application 132 may be configured to automatically, periodically, and/or selectively provide geographical location information (e.g., latitude and longitude) to the provider session management circuit 210. In one embodiment, the customer may schedule an appointment to withdraw an item from the customer's safety deposit utilizing a locker 1304 of the smart table 106 having a locker bay 1302. Prior to the scheduled appointment (e.g., 15 minutes, 1 hour, 1 day), the user client application 132 may provide geographical location information to notify a branch employee when the customer is within a predetermined distance of the branch (e.g., 1 mile, 5 miles, 25 miles) and when the customer has arrived at the branch location. Additionally, the user client application 132 may be configured to send the provider session management circuit 210 a notification and/or an update when a given user device 104 is active.

In some embodiments, a user device 104 may be considered active if, for example, the user device 104 is currently being used (e.g., by a customer or by an employee during a provider session with a smart table 106), a user has indicated that the provider computing system 102, the branch computing system 108, and/or the smart tables 106 are permitted to send/retrieve data to/from the user device 104, and/or the user device 104 is within a predetermined distance from the branch computing system 108 or one of the smart tables 106. In some embodiments, there may be additional manners in which the user device 104 may be considered active.

The input/output device 134 of each user device 104 may function substantially similar to and include the same or similar components as the input/output device 122 previously described, with reference to the provider computing system 102. As such, it should be understood that the description of the input/output device 122 provided above may also be applied to the input/output device 134 of each of the user devices 104. In some embodiments, the input/output device 134 of each user device 104 is similarly structured to receive communications from and provide communications to a user (e.g., customer or employee) associated with the plurality of user devices 104.

For example, the input/output device 134 may include one or more user interfaces, which may include one or more biometric sensors (such as an iris scanner, a fingerprint scanner, a heart monitor that identifies cardiovascular signals, etc.). The input/output device 134 may also include components that provide perceptible outputs (such as displays and light sources for visually-perceptible elements, a speaker for audible elements, and haptics for perceptible signaling via touch, etc.) and/or that permit the user to enter inputs (such as a stylus or force sensor for detecting pressure on a display screen). One or more user devices 104 may include one or more locations sensors to allow the user devices 104 to detect its location relative to other physical objects (e.g., a smart table 106 or other user devices) or geographic locations. Example locations sensors may include global positioning system (GPS) devices and other navigation and geolocation devices, digital compasses, gyroscopes and other orientation sensors, as well as proximity sensors or other sensors that permit the user device 104 to determine the presence and relative distance of nearby devices, objects, and/or locations.

Still referring to FIG. 1, the smart table system 100 includes one or more smart tables 106. The smart tables 106 may be tables of varying sizes integrated with cash handling endpoints. Furthermore, the smart tables 106 may provide a shared graphical user interface for various scenarios. In some embodiments, each of the smart tables 106 are associated with a smart table identifier, such as a numeric or alphanumeric code, to identify the respective smart table to the branch computing system 108, the provider computing system 102, and the user devices 104. For example, in response to walking into a lobby of a branch location for a scheduled provider session, a user device 104 associated with the customer may indicate to the customer which smart table 106 to go to in order to initiate the session. While described with regards to a FI, the smart tables 106 may be used in other scenarios. For example, the smart tables 106 may be used at a car dealership or car rental company, a hotel, a booking agent, and/or a medical office. The features of the smart tables 106 are described in greater detail below, with reference to FIG. 2.

Figure 1B:
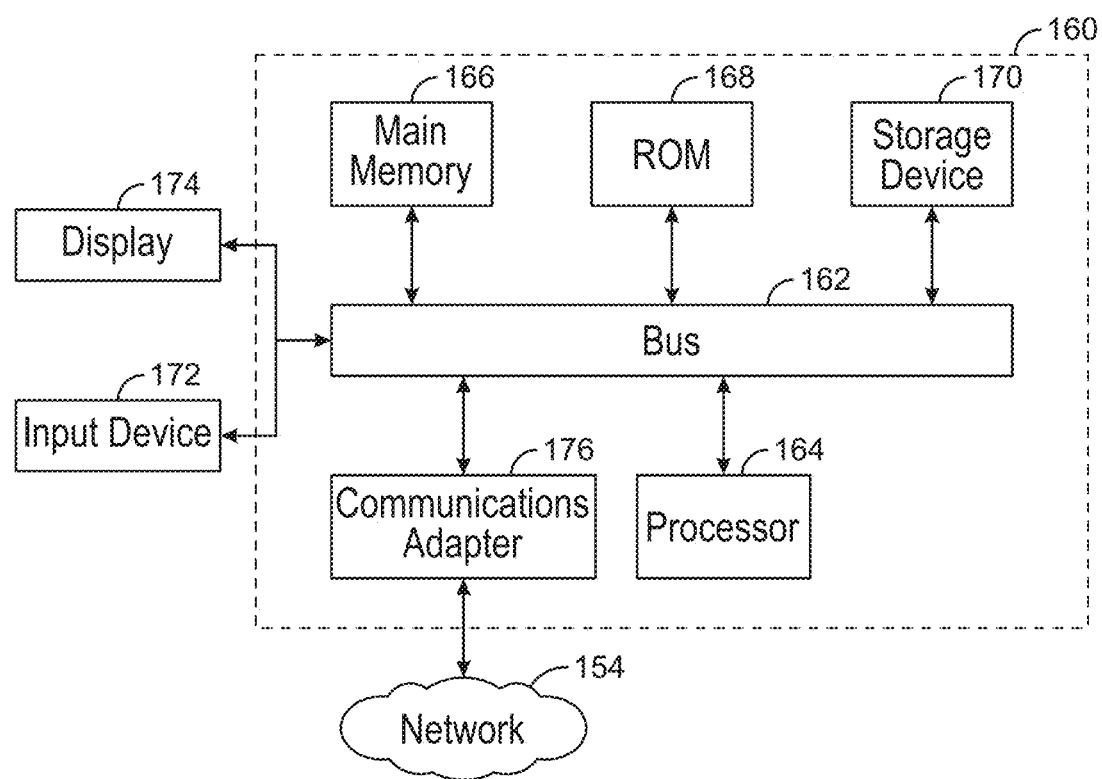
FIG. 1B is a block diagram illustrating an example computing system suitable for use in the various arrangements described herein.

FIG. 1B illustrates a depiction of a computing system 160 that can be used, for example, to implement a smart table system 100, provider computing system 102, user device 104, smart tables 106, branch computing system 108, and/or various other example systems described in the present disclosure. The computing system 160 includes a bus 162 or other communication component for communicating information and a processor 164 coupled to the bus 162 for processing information. The computing system 160 also includes main memory 166, such as a random-access memory (RAM) or other dynamic storage device, coupled to the bus 162 for storing information, and instructions to be executed by the processor 164. Main memory 166 can also be used for storing position information, temporary variables, or other intermediate information during execution of instructions by the processor 164. The computing system 160 may further include a read only memory (ROM) 168 or other static storage device coupled to the bus 162 for storing static information and instructions for the processor 164. A storage device 170, such as a solid-state device, magnetic disk or optical disk, is coupled to the bus 162 for persistently storing information and instructions.

The computing system 160 may be coupled via the bus 162 to a display 174, such as a liquid crystal display, or active matrix display, for displaying information to a user. An input device 172, such as a keyboard including alphanumeric and other keys, may be coupled to the bus 162 for communicating information, and command selections to the processor 164. In another arrangement, the input device 172 has a display 174. In some embodiments, the display 174 may be a touch screen display. The input device 172 can include any type of biometric sensor, a cursor control, such as a mouse, a trackball, or cursor direction keys, for communicating direction information and command selections to the processor 164 and for controlling cursor movement on the display 174.

In some arrangements, the computing system 160 may include a communications adapter 176, such as a networking adapter. Communications adapter 176 may be coupled to bus 162 and may be configured to enable communications with a computing or communications network 154 and/or other computing systems. In various illustrative arrangements, any type of networking configuration may be achieved using communications adapter 176, such as wired (e.g., via Ethernet), wireless (e.g., via Wi-Fi™, Bluetooth™, and so on), satellite (e.g., via GPS) pre-configured, ad-hoc, LAN, WAN, and so on.

According to various arrangements, the processes that effectuate illustrative arrangements that are described herein can be achieved by the computing system 160 in response to the processor 164 executing an arrangement of instructions contained in main memory 166. Such instructions can be read into main memory 166 from another computer-readable medium, such as the storage device 170. Execution of the arrangement of instructions contained in main memory 166 causes the computing system 160 to perform the illustrative processes described herein. One or more processors in a multi-processing arrangement may also be employed to execute the instructions contained in main memory 166. In alternative arrangements, hard-wired circuitry may be used in place of or in combination with software instructions to implement illustrative arrangements. Thus, arrangements are not limited to any specific combination of hardware circuitry and software.

Although an example processing system has been described in FIG. 1B, arrangements of the subject matter and the functional operations disclosed herein can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter disclosed herein can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 1B as singular, stand-alone devices, one of ordinary skill in the art will appreciate that, in some arrangements, the computing system 160 may comprise virtualized systems and/or system resources. For example, in some arrangements, the computing system 160 may be a virtual switch, virtual router, virtual host, virtual server, etc. In various arrangements, computing system 160 may share physical storage, hardware, and other resources with other virtual machines. In some arrangements, virtual resources of the network 154 (e.g., network 154 of FIG. 1) may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.).

Figure 2:
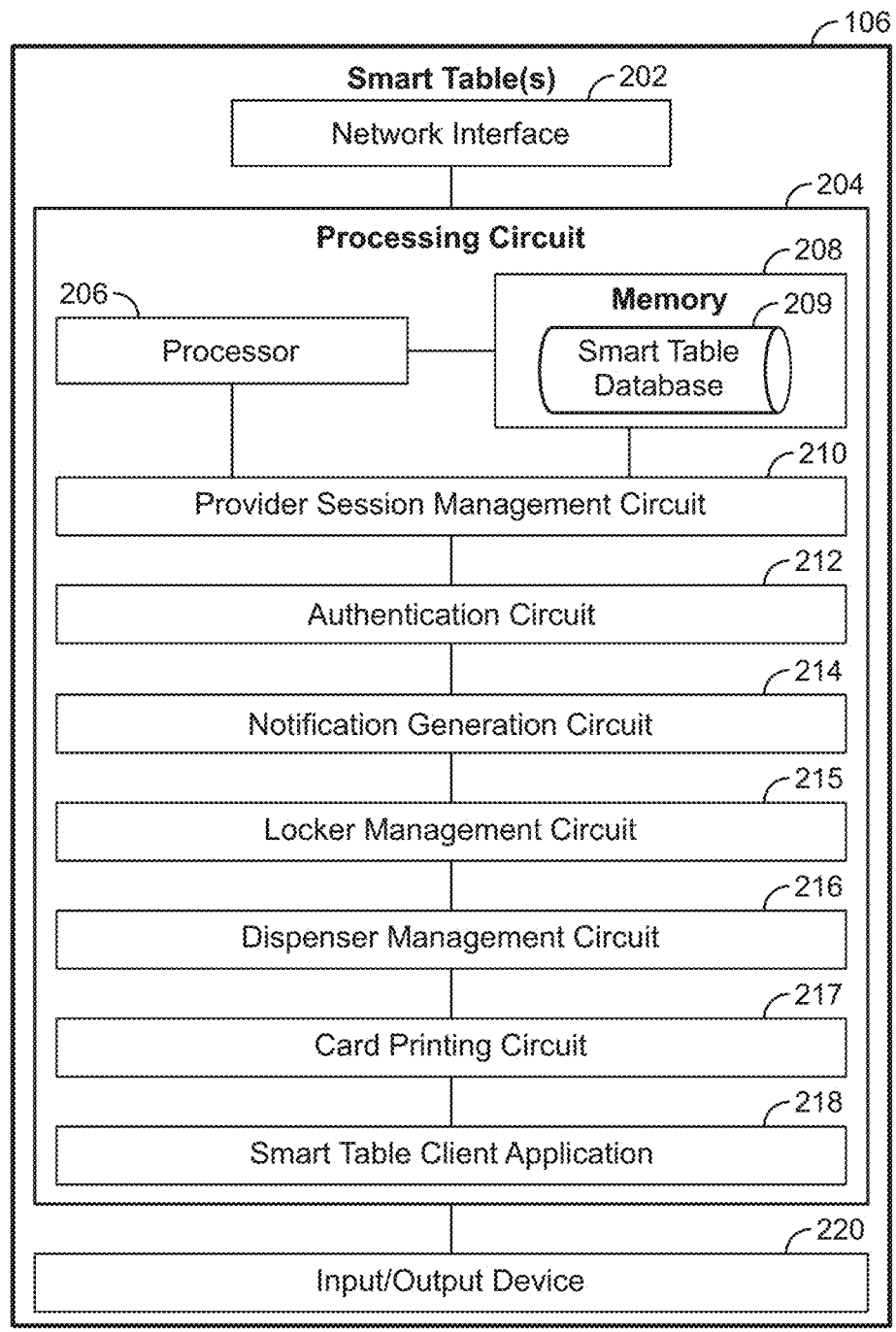
FIG. 2 is a block diagram of the smart table of FIG. 1, according to potential embodiments.

Referring now to FIG. 2, a block diagram of the smart tables 106 is shown, according to some embodiments. The smart tables 106 each similarly include a network interface 202, a processing circuit 204, and an input/output device 220. The network interface 202, the processing circuit 204, and the input/output device 220 may function substantially similar to and include the same or similar components as the network interface 110, the processing circuit 112, and the input/output device 122 described above, with reference to the provider computing system 102. Thus, it should be understood that the description of the network interface 110, the processing circuit 112, and the input/output device 122 of the provider computing system 102 provided above may be similarly applied to the network interface 202, the processing circuit 204, and the input/output device 220 of each of the smart tables 106.

For example, the network interface 202 is similarly structured and used to establish connections with other computing systems (e.g., the provider computing system 102, the branch computing system 108, the user devices 104) via the network 154. The network interface 202 may further include any or all of the components discussed above, with reference to the network interface 110.

The processing circuit 204 similarly includes a processor 206 and a memory 208. The processor 206 and the memory 208 are substantially similar to the processor 114 and the memory 116 described above. As such, the smart tables 106 are similarly configured to run a variety of application programs and store associated data in a database (e.g., smart table database 209) of the memory 208. For example, the smart tables 106 may be configured to run the application the smart table client application 218 that is stored in the smart table database 209. In another example, the smart tables 106 may be configured to store various provider and user data, such as, but not limited to, personal information (e.g., names, addresses, phone numbers, contacts, call logs, installed applications, and so on), authentication information (e.g., username/password combinations, device authentication tokens, security question answers, unique client identifiers), biometric data (such as digital representations of biometrics), geographic data, social media data, application specific data, and so on), and provider information (e.g., token information, account numbers, account balances, available credit, credit history, exchange histories, and so on) relating to the various users and/or various accounts.

The smart table client application 218 may be substantially similar to the provider client application 120 and the branch client application 150, but may instead be specifically for personalized provider sessions between customers and employees at the provider. For example, the smart table client application 218 is similarly structured to provide displays to each customer user device 104 to facilitate improved interactions between customers and specific branch employees associated with each smart table 106. Particularly, smart table client application 218 is configured to communicate with the provider computing system 102, the branch computing system 108, and the user devices 104 to receive instructions and notifications from the provider computing system 102 and/or the branch computing system 108 for the branch employees associated with each smart table 106 to perform various tasks associated with a provider session. Accordingly, the smart tables 106 are communicably coupled to the provider computing system 102 (e.g., through interactions with the provider client application 120), the branch computing system 108 (e.g., through interactions with the branch client application 150), and the user devices 104 (e.g., through interactions with the user client application 132), via a network (e.g., network 154).

The smart table client application 218 may therefore communicate with the provider computing system 102, the branch computing system 108, and the user devices 104 to perform several functions. For example, the smart table client application 218 is configured to receive data from the provider computing system 102 and/or the branch computing system 108 pertaining to necessary inputs for authenticating a particular transaction during a provider session. The smart table client application 218 is further configured to allow for communication with the provider client application 120 to allow the various branch employees that operate the smart tables 106 to provide questions or comments regarding any concerns with the smart tables. As such, the smart table client application 218 allows for the branch employees associated with the smart tables 106 to communicate with the customer, branch manager, and/or provider employees throughout the process of a provider session.

The input/output device 220 of each smart table 106 may function substantially similar to and include the same or similar components as the input/output device 134 described above, with reference to the user devices 104. Accordingly, it should be understood that the description of the input/output device 134 provided above may also be applied to the input/output device 220 of each of the smart tables 106. For example, the input/output device 220 of each smart table 106 is similarly structured to receive communications from and provide communications to customers paired (e.g., via a network connection, via Bluetooth™, via a shared connection, and so on) with a smart table 106 and to the branch employee or branch employees associated with each smart table 106. In some embodiments, the input/output device 220 may be structured to scan and recognize physical keys as well as key FOBs, Radio Frequency Identification (RFID) keys, etc. In further embodiments, the input/output device 220 may be structured to weigh items (e.g., safety deposit boxes). In some embodiments, the input/output device 220 may be able to weigh items on the screen of the smart table. In further embodiments, the input/output device 220 may require another device to weigh the item (e.g., connected scale). In yet some other instances, the input/output device 220 may be in communication with one or more weight sensing devices within one or more lockers 1304 (shown in FIG. 14) of the smart table 106. Each of the weight sensing devices may be configured to weigh items (e.g., safety deposit boxes) placed within the corresponding locker 1304.

The processing circuit 204 also includes a provider session management circuit 210, an authentication circuit 212, a notification generation circuit 214, a locker management circuit 215 and a cash dispenser management circuit 216, for example. In other embodiments, the processing circuit 204 may contain more or less components than shown in FIG. 2. The components of FIG. 2 are meant for illustrative purposes only, and should not be regarded as limiting in any manner. The provider session management circuit 210 may be configured to detect a trigger event for a provider session with the smart table 106. A provider session may include one customer (e.g., the smart table 106 is configured as a self-service ATM), a branch employee and a customer, a branch employee and more than one customer, and/or more than one branch employee and a customer, and/or more than one branch employee and more than one customer, according to some embodiments. For example, two customers that have a joint account together may participate in a provider session with a branch employee. In some embodiments, a trigger event includes detecting a user device 104 within a communication range of the smart table 106. In other embodiments, a trigger event includes the activation of a selectable icon on a graphical user interface of the smart table 106. In response to detecting a trigger event, the provider session management circuit 210 may be configured to send instructions to the notification generation circuit 214 to request input for customer and/or employee authentication.

In some embodiments, the provider session management circuit 210 is further configured to receive sensor data from the input/output device 220 of the smart table 106. For example, the provider session management circuit 210 may be configured to receive camera data of documents that a customer wants to scan and save, movement data from a motion detector, temperature sensor data, audio data indicating a selection and/or action, haptic feedback indicating selection action, and so on. Additionally, the provider session management circuit 210 may determine when to send reminders to a user device 104 of the branch employee regarding a provider session (e.g., to fill out a certain form, an individual's stress level, elevated access, manager help, to pre-load a compartment 1402 of the smart table 106) and/or when to send a session end reminder for a scheduled provider session. For example, the provider session management circuit 210 may be configured to track how much time is remaining in a scheduled session to wrap up a provider interaction with the customer.

The authentication circuit 212 may be configured to determine whether a user is authenticated to initiate a provider session and/or to complete certain provider tasks. For example, the authentication circuit 212 may be configured to request an authorization approval from the provider computing system 102 of a received PIN or biometric input. In some embodiments, the authentication circuit 212 is also configured to determine the level of authentication necessary to complete different types of financial tasks (e.g., withdrawal cash, take out a loan, make a new investment, change address, request new debit card, etc.). The authentication circuit 212 may be configured to generate a score of how authenticated a user is during a provider session. For example, a user that entered both a biometric input and an alphanumeric passcode may receive a first score of 100% authenticated, and a user that only entered a PIN may receive a second score of 50% authenticated. The generated score of how authenticated the user is during a provider session can be used to determine access to a safety deposit box. For example, a user that is 100% authenticated may be able to access a safety deposit box and make deposits and removals. A user that is 75% authenticated may be able to access a safety deposit box and make deposits. A user that is 50% authenticated may be able to access a safety deposit box, but not be able to make deposits or removals. Additionally, a user that is under 50% authenticated may not be able to access a safety deposit box. The authentication circuit 212 is also configured to send instructions to the cash dispenser management circuit 216 in response to receiving an approved authorization (e.g., from the provider computing system via the network 154) to dispense cash to a customer for a withdrawal request.

The notification generation circuit 214 may be configured to create alerts regarding an upcoming provider session, an in-progress provider session, and/or a completed provider session, according to some embodiments. The notification generation circuit 214 may also receive instructions on the format of a notification from the provider session management circuit 210. In some embodiments, the notification generation circuit 214 is configured to instruct the input/output device 220 of the smart table 106 to provide audible and/or visual output to a customer regarding information displayed during a provider session. For example, the notification generation circuit 214 may be configured to cause a Near Field Communication (NFC) icon on a graphical user interface of the smart table 106 to flash to indicate to a user to place a user device 104 on the NFC icon to pair to the smart table 106. As another example, the notification generation circuit 214 may be configured to generate a notification that outputs a voice-over indicating the provider session will terminate within a certain time interval, such as a five minute warning to complete any unfinished tasks.

The locker management circuit 215 may be configured to control the use of the lockers 1304 of the smart table 106 with a locker bay 1302. In some embodiments, the locker management system may determine a locker status for each of the lockers 1304. The locker status may be configured to indicate which of the lockers 1304 are in use, and which of the lockers 1304 are empty and able to be used for item deposits. In some embodiments, the locker management circuit 215 updates the locker statuses based on transactions throughout the day. In further embodiments, the locker management circuit 215 unlocks or locks the locker 1304 depending on the step of the banking session a given customer is performing and/or whether the customer is authenticated and authorized to access a given locker 1304. In some embodiments, the locker management circuit 215 may determine which safety deposit boxes are available and update the locker statuses based on customers acquiring or removing a safety deposit box. In some instances, the locker management circuit 215 may further be configured to instruct the notification generation circuit 214 to prompt the user to weigh the safety deposit box prior to and/or after the customer adding or removing any items from the safety deposit box. For example, the customer may be notified by the smart table 106 to weigh the safety deposit box on the smart table 106, using a separate weight measurement device, or using a weight measurement device within one of the lockers 1304. In some embodiments, the locker management circuit 215 may create an audit trail that monitors the weights of the safety deposit box within the lockers 1304 and logs the weights in the customer account database 118 to ensure that a full log of deposits and withdrawals is maintained. Additionally, if a customer deposits a new item or removes an existing item from the safety deposit box, the customer may receive a notification by the user device 104 to confirm a new weight as a "default weight" of the safety deposit box.

Still referring to FIG. 2, the cash dispenser management circuit 216 may be configured to control the use of the cash dispenser of the smart table 106. In some embodiments, the cash dispenser management circuit 216 is further configured to determine when the amount of available cash at the smart table 106 is below a threshold value (e.g., $100). The cash dispenser management circuit 216 may then instruct the notification generation circuit 214 to create a notification of the low amount of cash at the smart table 106 to the branch computing system 108 and/or a user device 104 (e.g., a branch manager user device 104). In some embodiments, the cash dispenser management circuit 216 is also configured to transmit an instruction to update a balance of the customer account to the provider computing system 102, for example, after the transaction request is completed. The cash dispenser management circuit 216 may further be configured to instruct the input/output device 220 of the smart table 106 to print a receipt with transaction details, such as the amount of cash withdrawn, the time of the completed transaction, an updated balance for the customer account used to complete the transaction, times when the box was removed and re-deposited into the locker, a date stamp, and/or a weight of the box when removed and re-deposited and any change in weight.

The card printing circuit 217 may be configured to control the use of the card printer of the smart table 106. In some embodiments, the card printing circuit 217 is further configured to determine various information for printing a card (e.g., debit card, credit card, rewards card, and so on). For example, a pseudo-random number (e.g., debit card number unique to an individual and/or a particular account of the individual) for the card may be generated by the card printing circuit 217. In another example, a design (e.g., color, artwork, templates) for the card may be determined based on a user preference and/or smart table 106 preference. In some embodiments, the card printing circuit 217 is also configured to transmit an instruction to update a card of the customer account to the provider computing system 102, for example, after a new card is printed. The card printing circuit 217 may be configured to print temporary, permanent, or replacement cards that allow a user to access a safety deposit box and act as a form of authentication. The card printing circuit 217 may further be configured to instruct the input/output device 220 of the smart table 106 to print a receipt with card details, such as the limit on the card, the name on the card, an updated card verification value (CVV), an updated PIN, and so on.

The use of the smart table 106 within the smart table system 100 may beneficially reduce significant amounts of time to complete provider interactions during a provider session and/or fill out paperwork forms. Furthermore, the smart tables 106 may help improve transparency of customer account information and employee services and increase face-to-face time with the branch employees. By providing a larger graphical user interface to share customer account information, rather than on a tiny screen on a single user device, the smart tables 106 also increase the amount of inclusion for each party participating in the provider session. The smart tables 106 may additionally help inform customers of several choices and advise the customers by displaying information from the branch employee regarding the customer account information utilizing visual tools. In some embodiments, the visual tools may include pie charts, bar graphs, scatterplots, user graphics, and so on. The smart tables 106 may be configured such that a customer sits while using, or may be configured such that a customer stands while using.

Figure 3:
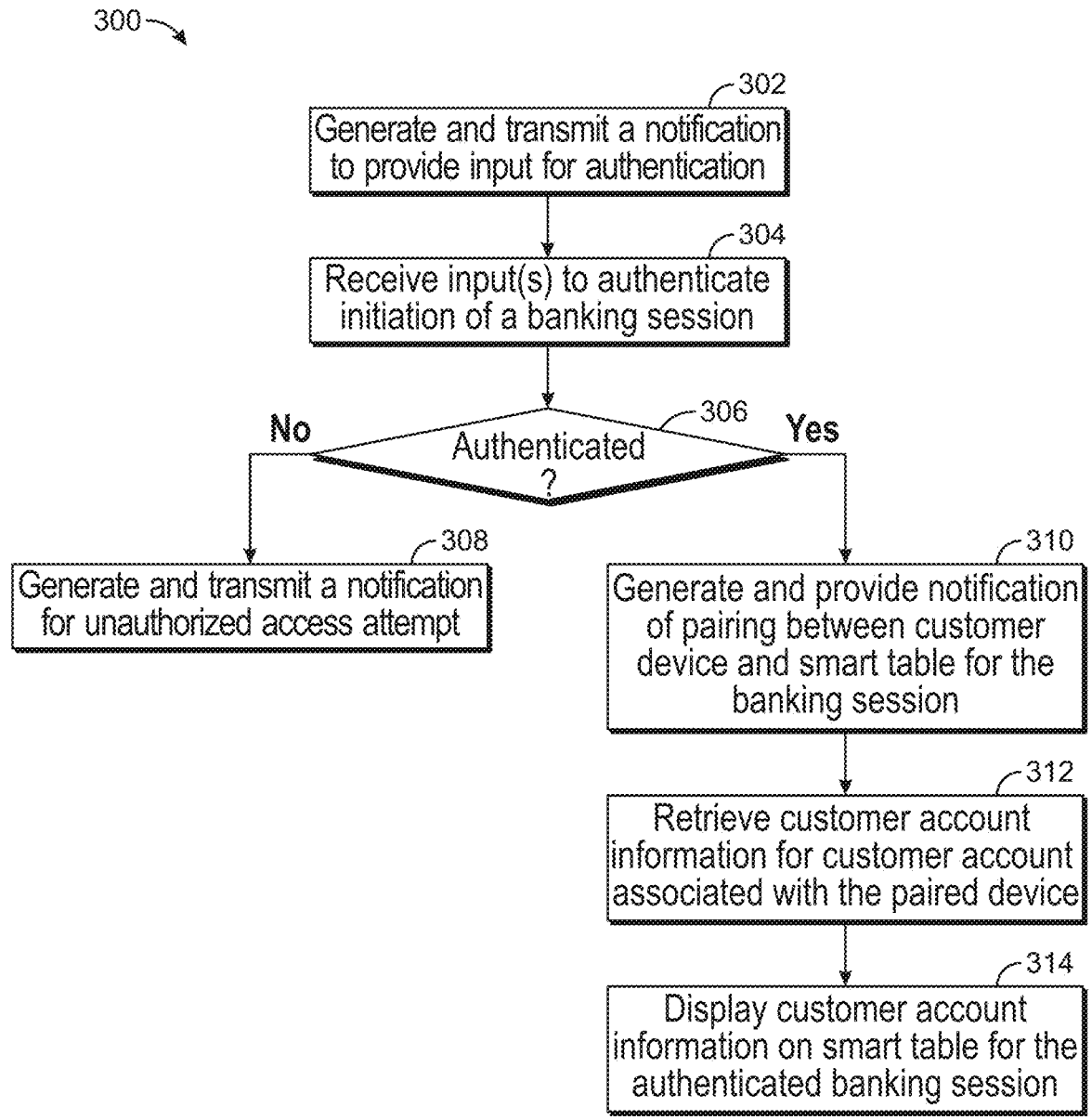
FIG. 3 is a flow diagram of a method for initiating a session with the smart table of FIG. 1, according to example embodiments.

Referring now to FIG. 3, a flow diagram of a method 300 for initiating a session between one or more user devices 104 and a smart table 106 is shown, according to some embodiments. The method 300 may be provided by and/or accessible by the provider client application 120, the branch client application 150, the user client application 132, and the smart table client application 218, for example. The method 300 may be performed by the smart table system 100 described above pertaining to FIGS. 1 and 2. In some embodiments, the method 300 begins in response to receiving, by a smart table 106, a session trigger event. A session trigger event may be any event that triggers the beginning of a session between the smart table 106 and a user device 104. For example, when a customer is within a certain proximity of the smart table 106, the user device 104 associated with the customer that the customer is holding may be within a wireless communication range of various devices (e.g., the branch computing system 108 and/or the smart table 106) associated with the branch location. In response to entering the wireless communication range, the respective user device 104 may be configured to automatically request the customer, via the user device 104, to enter confirmation to establish a secure connection with the smart table 106. As such, the security of the provider session may increase, as a customer may be required to be within a certain proximity (e.g., latitude and longitude) of the smart table 106 to begin the provider session. In some embodiments, similarly, a user device 104 of an employee scheduled to be running a provider session for the smart table 106 may also be required to be within proximity of the smart table 106 in order to initiate the provider session. A session trigger event may also include receiving an input via input/output device 220, such as receiving a user interaction via a touch screen display of the smart table 106. In other embodiments, a session trigger event may include a customer or employee logging into a user client application 132 on a user device 104. In additional embodiments, a session trigger event may occur at a specific time, such as in response to the provider session management circuit determining there is a scheduled provider session at a smart table 106 at a specific time. In some embodiments, the smart table 106 may be configured to operate in a low power mode or "sleep mode" until a session trigger event is received.

At 302, the method 300 includes generating and transmitting a notification to a customer device (e.g., a user device 104) to provide an input for authentication. In some embodiments, the notification generation circuit 214 is configured to execute step 302 in response to receiving an instruction from the provider session management circuit 210. The notification generation circuit 214 may be configured to generate a notification requesting user authentication based on information received, via the network 154, from the smart table management circuit 148 and customer account database 118. For example, specific smart tables 106 may require higher levels of authentication before a user may initiate a provider session based on the capabilities of the smart table. Additionally, the customer account database 118 may have stored customer preferences indicating one or more types of input the customer wants to use for authenticating a provider session. Input for authentication may include a personal identification number (PIN), a biometric input (e.g., a fingerprint, a palm print, an eye scan, a voice sample, etc.), a haptic device input (e.g., rings, jewelry, headsets, bands), smart glasses input, an alphanumeric passcode, a barcode, a QR code, a physical key, an electronic key (e.g., a token stored on the user device 104 of the customer), a physical or mobile wallet card (e.g., a credit card with chip technology, a virtual provider card), and so on. In some embodiments, the generated notification may include audible or tactile output when received by the user device 104. For example, in response to receiving the generated notification, the user device 104 may create an audible sound, via the input/output device 134, to catch the attention of the customer and/or an employee working with the customer and/or may cause the user device 104 to vibrate.

In other embodiments, instead of transmitting the notification to a user device 104, the notification requesting an input to authenticate the customer is shown on a display screen of the smart table 106. For example, the notification generation circuit 214 may generate a notification requesting a customer to place a palm on a highlighted area of the display screen of the smart table 106. As another example, the notification generation circuit 214 may provide a notification shown on the display screen of the smart table 106 asking a customer to enter a customer PIN on the customer's user device 104. In some embodiments, the generated notification also includes a message to place the user device 104 associated with the customer on a particular area of the smart table 106. For example, a highlighted area may indicate where to place the user device 104 in order to facilitate using near-field communication data exchange.

The input to authenticate initiation of a provider session is received at step 304. In some embodiments, the authentication circuit 212 is configured to receive the input to authorize initiating the provider session. One or more inputs may be received at step 304, according to some embodiments. For example, in some provider sessions, more than one customer may be detected and/or scheduled to participate in the provider session. As such, the authentication circuit 212 may receive inputs from each customer for the provider session. Additionally, an input to authenticate an employee scheduled to participate in the provider session may also be received at 304. For example, for provider sessions scheduled to conduct transactions with higher security, a branch manager may be required in order to initiate the provider session. As such, authentication inputs may be received from the customer and the branch manager at step 304.

In some embodiments, the inputs are received via the user devices 104 and transmitted to the smart table 106 via the network 154. In other embodiments, the one or more inputs may be received directly by the smart table 106 via the input/output device 220. For example, a PIN for authentication may be entered via a user interface of the customer's user device 104, or a fingerprint may be entered via the input/output device 220 (e.g., a fingerprint scanner) of the smart table 106. Beneficially, a customer may then enter personal authentication information in a more private setting, rather than entering personal authentication information on the smart table 106. As such, the security of the customer's personal information may be improved.

At step 306, the method 300 includes determining whether one or more users are authenticated to initiate the provider session. In some embodiments, the authentication circuit 212 is configured to determine whether authentication for the provider session is successful. The network interface 202 may transmit, via the network 154, the received input to the branch computing system 108 and/or the provider computing system 102. In some embodiments, the provider computing system 102 and/or the branch computing system 108 then determine whether the received input matches user information stored in a database (e.g., in customer account database 118, in employee database 144). For example, the provider computing system 102 determines whether a device token received from the user device 104 matches a token stored in a token vault of the customer account database 118. The network interface 202 may then receive confirmation or a denial of authentication for the one or more users (e.g., a customer, a customer and an employee, more than one customer, etc.). In some embodiments, the authentication circuit 212 is configured to execute step 306 at certain intervals throughout a provider session. For example, after a predetermined time interval, or at the end of a scheduled provider session, the authentication circuit 212 may be configured to re-authenticate the one or more customers and/or employee.

In response to determining one or more of the users were not authenticated, the method 300 proceeds to step 308. The method 300 includes generating and transmitting a notification for an unauthorized access attempt at step 308. In some embodiments, the notification generation circuit 214 is configured to execute the operations at 308. The notification generation circuit 214 may be configured to generate a text notification, an email notification, an automated voiceover notification, and/or any kind of alert to notify a user. The notification generation circuit 214 may be configured to include details concerning the access attempt in the generated notification. For example, the notification may include branch location information (e.g., name, address) and/or a timestamp of when the attempt to initiate a provider session was denied. In some embodiments, the notification also may include contact information for a branch manager and instructions concerning the security of a customer's personal data. For example, the generated notification may include options to view user account details, transaction history, previous provider session history, and so on. The generated notification may also include selectable options to change one or more inputs for authentication (e.g., change a user passcode, change a user PIN, print a new card, etc.) and/or user preferences (e.g., preferences for increased security before access is granted to customer information). In some embodiments, the notification is transmitted to a user device 104 associated with a customer. The notification may also be transmitted, via the network 154, to a user device 104 associated with a branch manager and/or an employee assigned to a scheduled provider session.

On the other hand, if the authentication circuit 212 determines at step 306 that the one or more users are successfully authenticated, the method 300 proceeds to step 310. At step 310, the method 300 includes generating and providing a notification of a successful pairing between customer device (e.g., user device 104) and the smart table 106 for the provider session. In some embodiments, the notification generation circuit 214 is configured to generate a text alert or email alert indicating the establishment of a secure communication session with the smart table 106. The type of generated notification (e.g., email, text, phone call, etc.) may be based on user preferences. For example, the provider session management circuit 210 may receive session preferences for a customer stored in customer account database 118. The provider session preferences may include the kind of notifications the customer wants to receive. The preferences may also include information on where to direct the generated notification. For example, customer preferences may include contact information (e.g., an email of a parent of the customer, a phone number, etc.) to send the generated notification. As such, in some embodiments, the notification may be provided to one or more user devices 104. The generated notification for a successful pairing between the customer user device 104 and the smart table 106 may also be provided via the input/output device 220 of the smart table 106. For example, the smart table 106 may show the notification on a display screen.

At step 312, the method 300 includes retrieving customer account information for the customer account associated with the paired customer user device 104. In some embodiments, the provider session management circuit 210 is configured to execute step 312. The provider session management circuit 210 may be configured to request, via the network interface 202, customer account information from the provider computing system 102. In some embodiments, the amount of customer account information retrieved is relative to the security of the provider session. For example, the customer account information retrieved is relative to the type of input received for user authentication. As an example, if only a passcode was entered, the customer account information that is retrieved may be more limited than if a passcode and a biometric input were entered to authenticate the customer. In some embodiments, customer account information may include previous provider session history, transaction history for the customer account, balances for various accounts (e.g., savings accounts, checking accounts, credit card accounts), loan information, mortgage information, personal information (e.g., name, address, age, education, occupation, salary, etc.), credit card debt, current investments, retirement plans, savings goals, and so on. The provider session management circuit 210 may also be configured to pull specific documents concerning planned transactions for a scheduled provider session at 312. For example, a prepared document regarding a loan may be retrieved at step 312 for a branch employee to review with the customer during the scheduled provider session.

Once the customer account information has been retrieved, at step 314, the customer account information may be displayed on the smart table 106 for the authenticated provider session. In some embodiments, the customer account information may be displayed in a customer area of a display screen of the smart table 106. In other embodiments, the customer account information may be displayed on the customer's user device 104 rather than on a display screen of the smart table 106. For example, for certain customer account information that is more confidential, such as a social security number, and/or customer account information that a customer indicated in preferences should not be shown during a provider session on a smart table, such as a salary or the customer's overall financial worth, the provider session management circuit 210 may be configured to only provide that information on the customer's user device 104. In some embodiments, the customer account information may be displayed using tables, graphics, and/or other visual tools to help convey the data to the customer in a meaningful manner. For example, concerning retirement, a graphic may show a portion of the customer's current earnings that should be set aside for retirement and the progress the customer has made in saving for retirement over a specific period of time.

Figure 4:
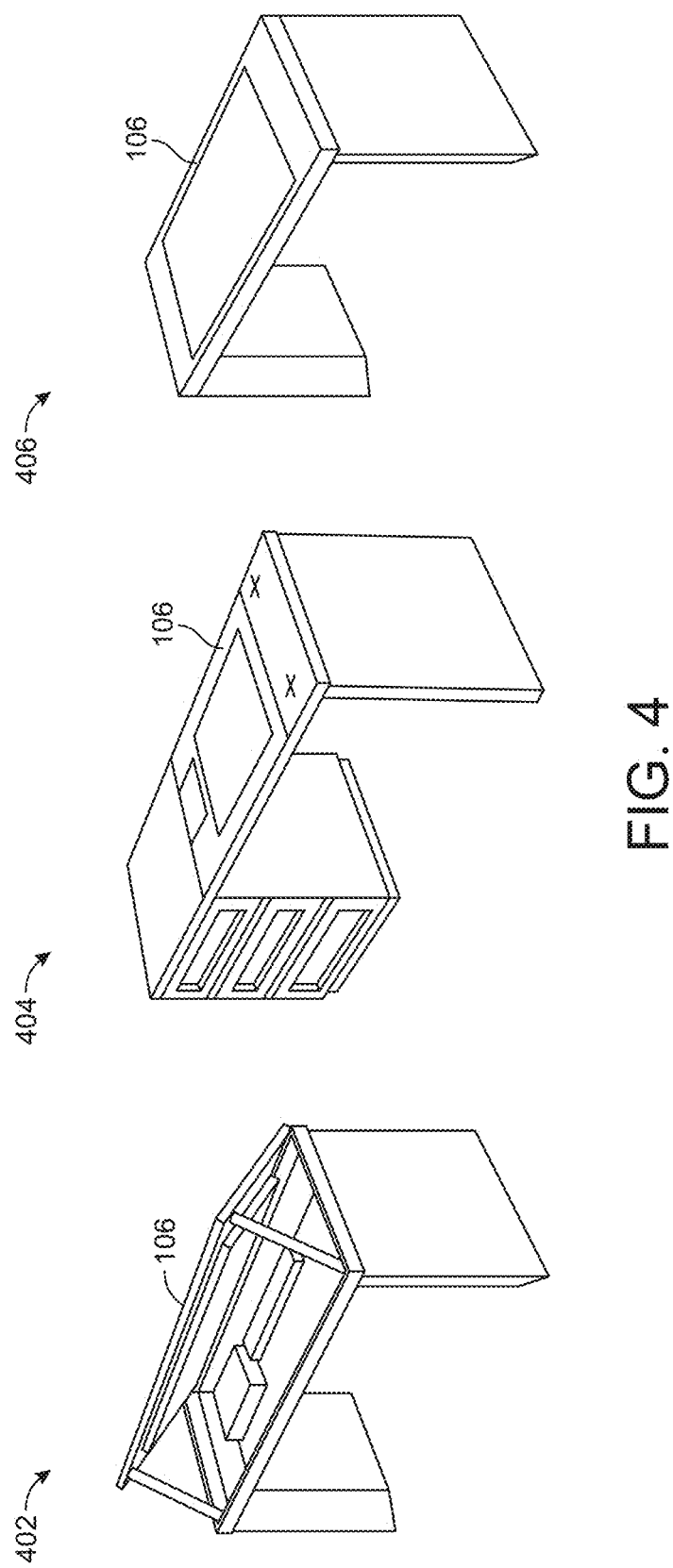
FIG. 4 is an illustration of various configurations of the smart table of FIG. 1, according to example embodiments.

Referring now to FIG. 4, an illustration of various configurations of the smart table 106 are shown, according to some embodiments. A perspective view 402 of a smart table 106 depicts a storage compartment beneath a top surface of the smart table 106. In some embodiments, the cash dispenser of the smart table 106 may be accessed by lifting a top surface of the smart table 106. As such, the cash dispenser may easily be serviced by lifting the top surface of the smart table 106, covering the storage compartment. In other embodiments, a storage compartment of the smart table 106 may be accessed by sliding the top surface to a side of the smart table 106, rather than lifting the top surface. A perspective view 404 of a smart table 106 shows an integration of storage compartments for the smart table 106 and a digitally enabled, touch screen display, according to some embodiments. A perspective view 406 of a smart table 106 depicts a touch screen display encompassing the top surface of the smart table 106. In some embodiments, the smart table 106 may not include a cash dispenser, as shown in perspective view 406. The views shown in FIG. 4 are meant to be illustrative in purpose only, and should not be regarded as limiting in any manner.

Figure 5:
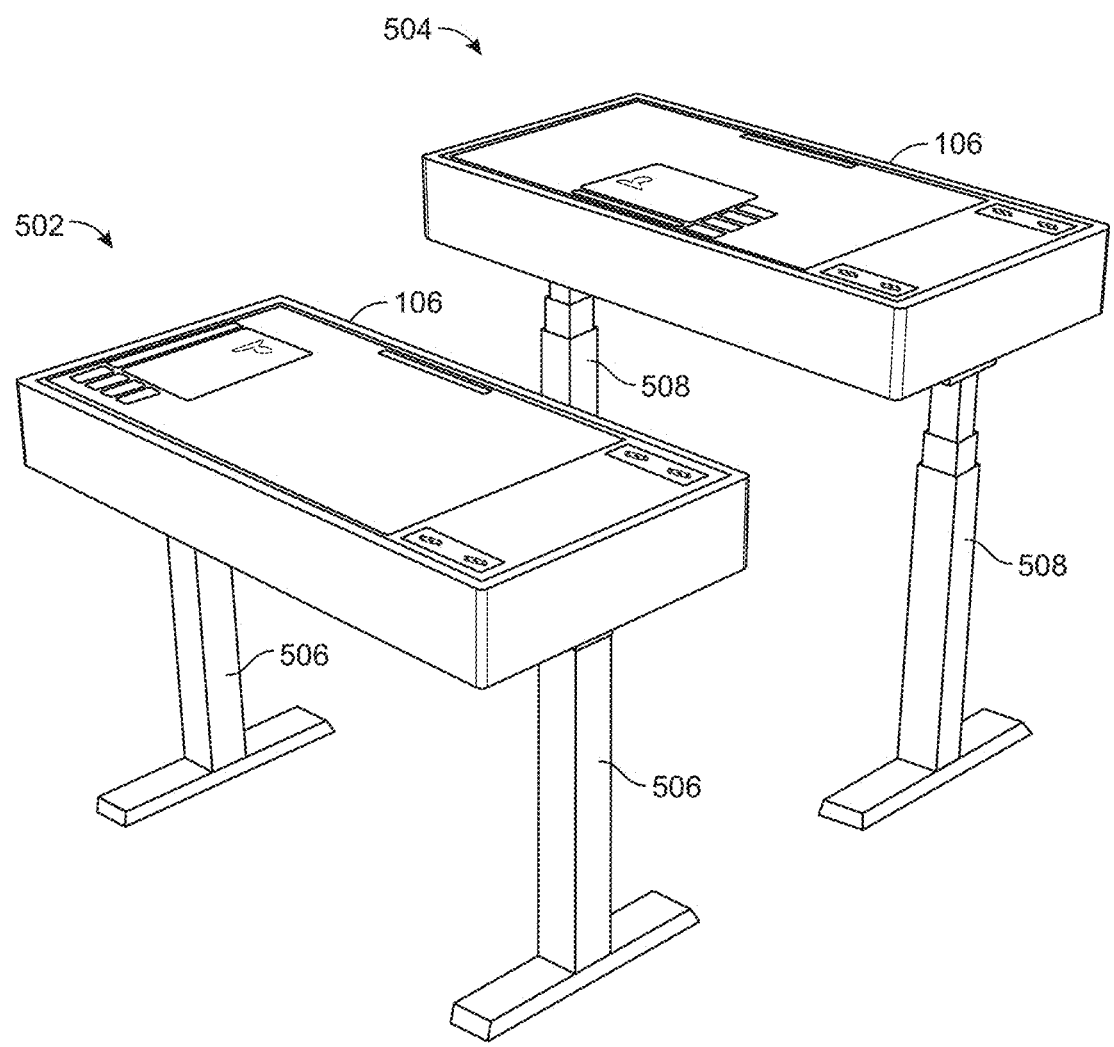
FIG. 5 is an illustration of additional configurations of the smart table of FIG. 1, according to example embodiments.

Referring now to FIG. 5, an illustration of additional configurations of the smart table is shown, according to some embodiments. Perspective view 502 depicts a smart table 106 with a touch screen display and legs 506 at a set height. Perspective view 504 shows a smart table 106 including a touch screen display and legs 508. In some embodiments, the legs 508 may be adjusted to varying heights based on user preference. For example, a user may increase or decrease the height of the smart table 106 by operating motorized lifting columns to increase or decrease the height of the legs 508. In some embodiments, the motorized lifting columns of the legs 508 are activated using a switch on the smart table 106. In other embodiments, the height of the smart table 106 is increased or decreased by entering an input via a touch screen of the smart table 106.

Figure 6:
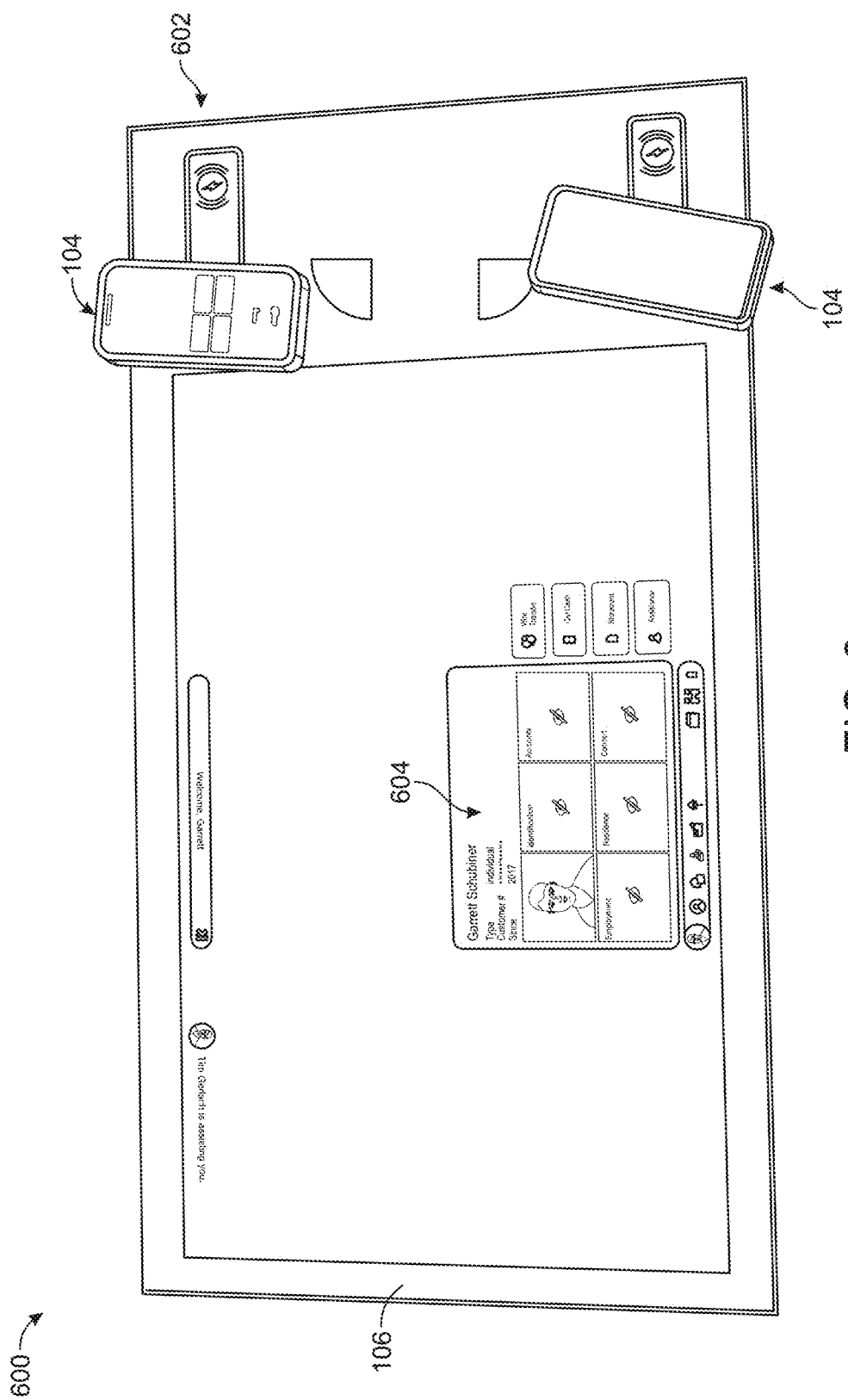
FIG. 6 is an illustration of a user interface of the smart table and paired user devices of FIG. 1, according to example embodiments.

Referring now to FIG. 6, an illustration of a user interface 600 of the smart table 106 and paired user devices 104 is shown, according to some embodiments. The user interface 600 may be provided by the smart table client application 218. In some embodiments, the user interface 600 is generated and displayed, via an input/output device 220, by the provider session management circuit 210. The user interface 600 includes account summary window 604, for example. The account summary window 604 may include a name, address, photo identification, and contact information for a customer. In some embodiments, the account summary window 604 is displayed in response to receiving a selection of a profile icon on the user interface 600. The user interface 600 also includes a device area 602. In some embodiments, the device area 602 includes a charging icon and a wireless connection icon. The connection icon may indicate to one or more users (e.g., a customer, two customers, a customer and an employee, etc.) where to place a user device 104 in order to pair to the smart table 106. As such, the connection icons shown on the user interface 600 may be used as indicators of the locations of NFC tags within the smart table 106. In some embodiments, the user interface 600 may utilize different colors to indicate a successful pairing and an unsuccessful pairing in device area 602. For example, the connection icon may turn green in response to a successful pairing to the respective user device 104 placed over the connection icon. Although FIG. 6 depicts two user devices 104, the smart table 106 may be configured to pair to more than two different user devices 104, according to some embodiments.

Figure 7:
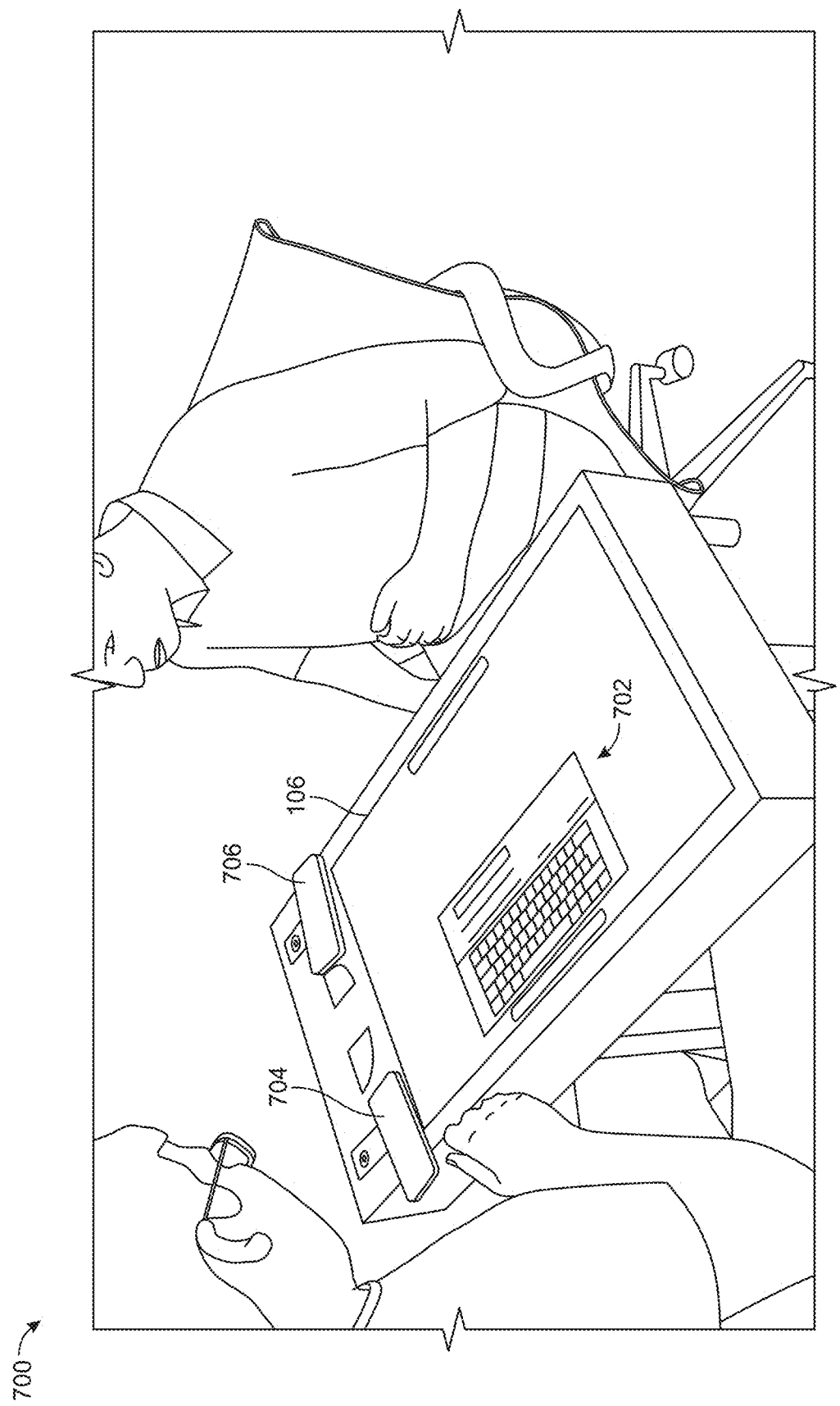
FIG. 7 is an illustration of a user interface of the smart table of FIG. 1 configured to receive an input from a customer or provider representative, according to example embodiments.

Referring now to FIG. 7, an illustration 700 of a user interface of the smart table 106 configured to receive an input from a customer or provider representative is shown, according to some embodiments. The illustration 700 depicts a keyboard 702, a customer device 704, and an employee device 706. The customer device 704 and the employee device 706 may both be the same or similar as the user devices 104 described above. In some embodiments, the keyboard 702 is displayed on a user interface of the smart table 106 to provide an input for the customer. The keyboard 702 may be displayed to enter new information, such as a change of address for the customer. In some embodiments, the keyboard 702 is oriented on a display screen of the smart table 106 based on whether a customer or an employee needs to enter information. For example, the smart table 106 may serve as a desk for a provider employee (e.g., a banker, lawyer, a consultant, a real estate agent). As such, while sitting down at the smart table 106, the customer and the branch employee may be seated on opposite sides of the smart table 106. In some embodiments, the input/output device 220 of the smart table 106 is configured to determine an orientation and position for the keyboard 702 based on data received from sensors and/or cameras of the smart table 106.

Figure 8:
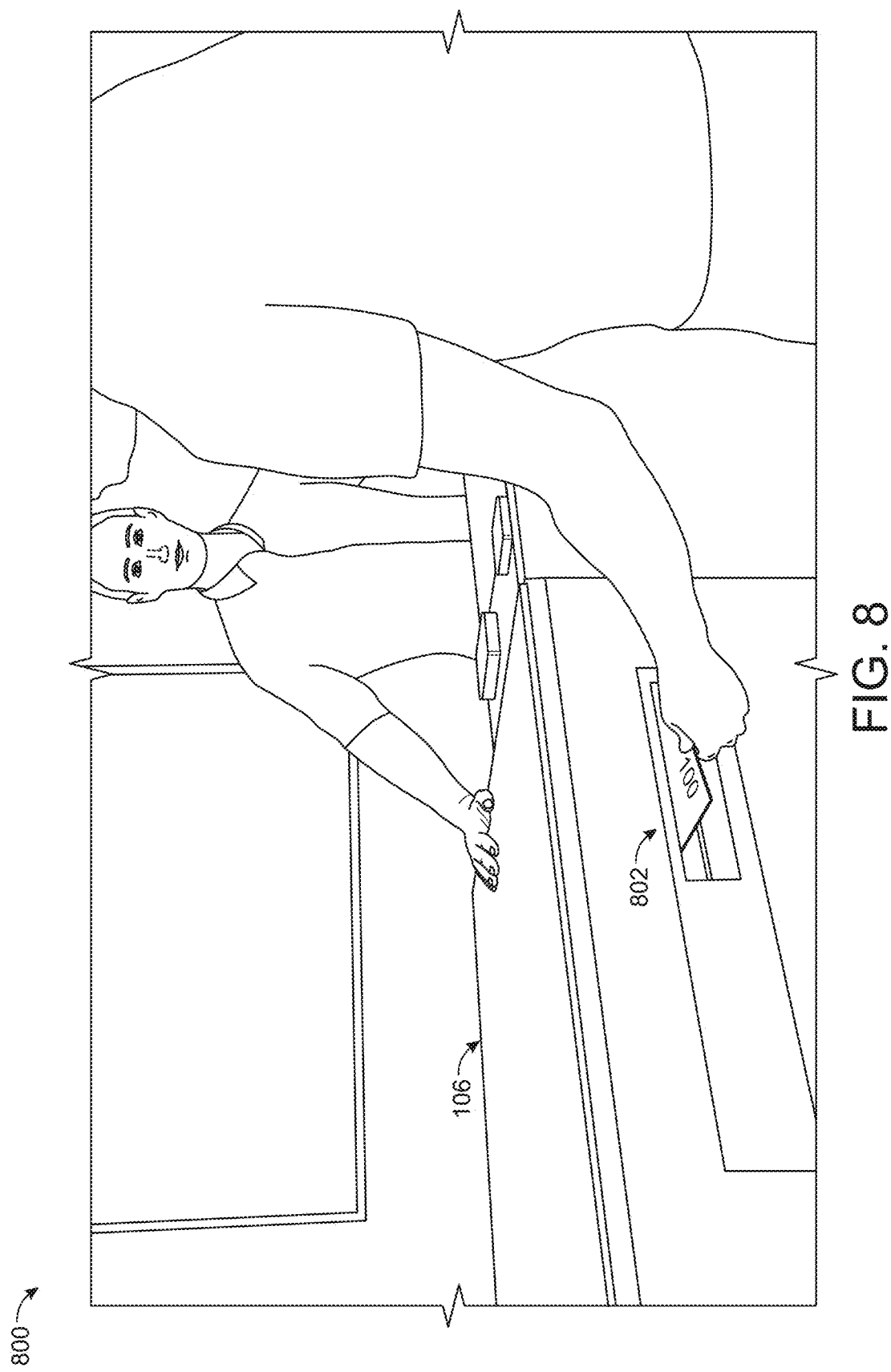
FIG. 8 is an illustration of the smart table of FIG. 1 including a dispensing mechanism, according to example embodiments.

Referring now to FIG. 8, an illustration 800 of the smart table 106 including a dispensing mechanism 802 is shown, according to some embodiments. The dispensing mechanism 802 can be a cash dispenser, though it will be appreciated that the dispensing mechanism 802 can be configured to dispense any type of item, such as cash, a receipt, checks, stamps, and so on. Accordingly, the smart table 106 may beneficially be utilized as an automated teller machine (ATM). In some embodiments, the smart table 106 may be used as an assisted-service ATM, as shown in FIG. 7. The smart table 106 may also function as a station for tellers at a branch location. In other embodiments, the smart table 106 may be used as a self-service ATM, without using employees to supervise the transaction at the smart table 106. The smart table 106 may be configured to pair with the user device 104 of the customer before dispensing cash via the dispensing mechanism 802. For example, the cash dispenser management circuit 216 is configured to receive approval from the authentication circuit 212 before providing cash to a customer using the smart table 106.

Figure 9:
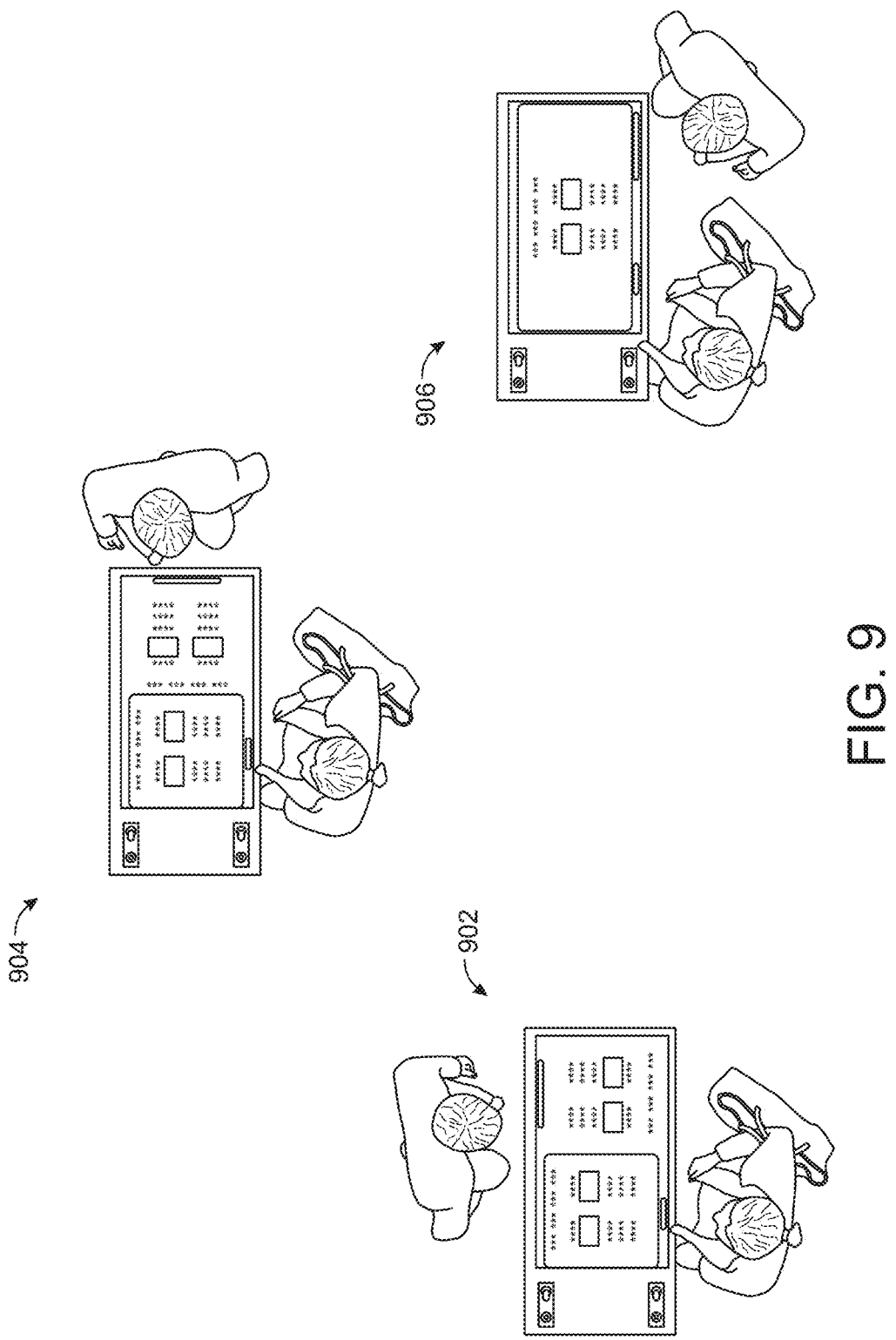
FIG. 9 is an illustration of various user interface orientations displayable by the smart table of FIG. 1, according to example embodiments.

Referring now to FIG. 9, an illustration 902 of various user interface orientations displayable by the smart table 106 is shown, according to some embodiments. A first user interface orientation 902 includes a user interface of a smart table 106 with half of a customer interface area and half of a branch employee interface area. In some embodiments, the branch employee interface area is rotated 180 degrees from the customer interface area in a traditional setting for when the branch employee is on an opposite side of the smart table 106 from the customer. A second user interface orientation 904 includes a user interface of the smart table 106 with the customer interface area and the branch employee interface area rotated 90 degrees from the customer interface area for a more casual setting. A third user interface orientation 906 includes a user interface of the smart table 106 with one interface area for both the customer and the branch employee. In some embodiments, the third user interface orientation 906 shows the customer interface area for when the customer and the branch employee are on the same side of the smart table 106, for example.

Figure 10:
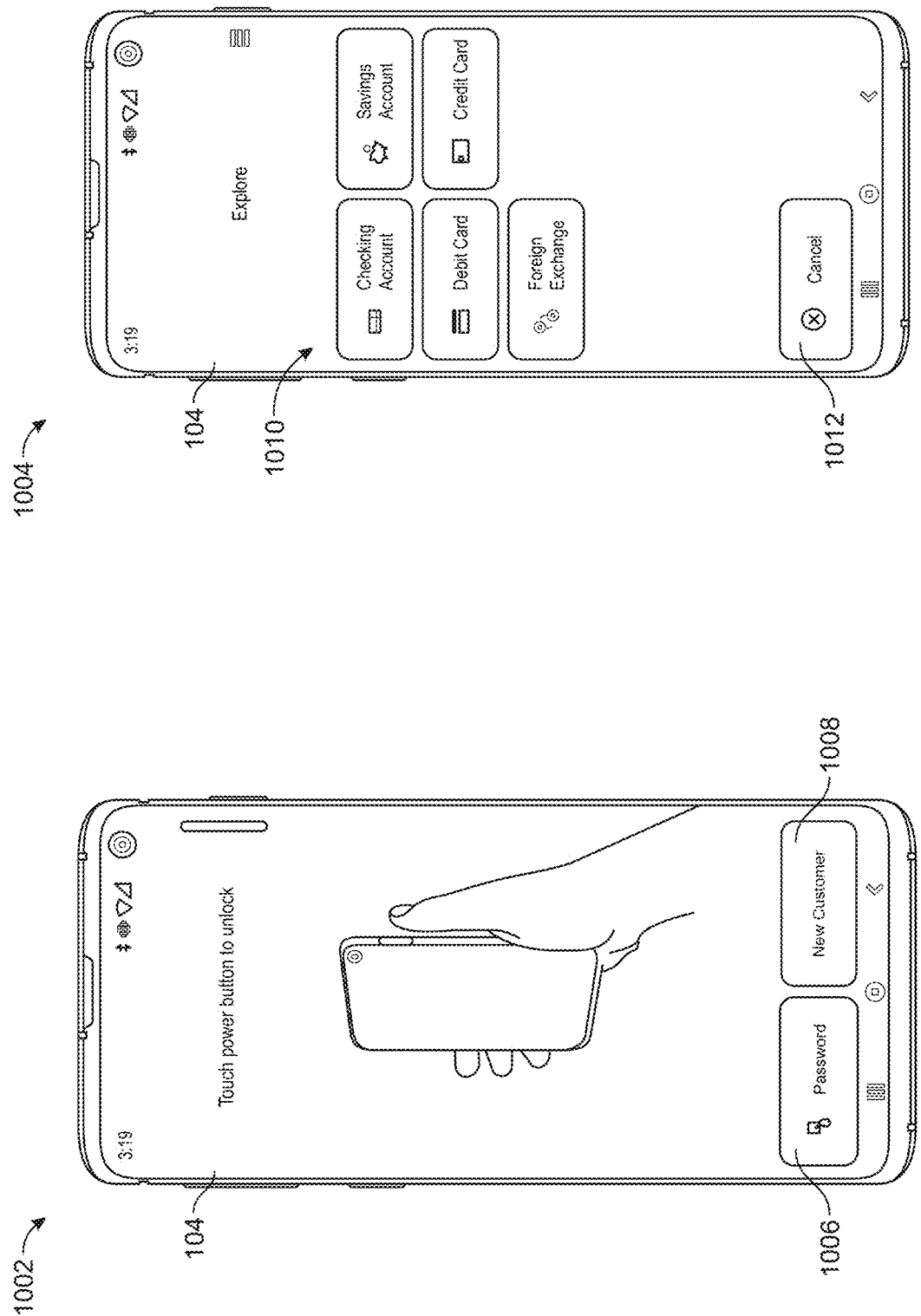
FIG. 10 is an illustration of example user interfaces of the user device of FIG. 1 when the user device is paired to the smart table of FIG. 1, according to example embodiments.

Referring now to FIG. 10, an illustration of example user interfaces of the user device 104 when the user device 104 is paired to the smart table 106 is shown, according to some embodiments. FIG. 10 includes user interface 1002 and user interface 1004. In various embodiments, the user interface 1002 and the user interface 1004 are generated by the smart table system 100 described above with reference to FIG. 1. In some embodiments, the user interface 1002 and the user interface 1004 are generated during the method 300 described above with reference to FIG. 3. The user interface 1002 may be displayed on a user device 104 associated with a customer attempting to pair to a smart table 106, for example. The user interface 1002 may include activatable icons for selecting various options regarding authenticating the customer. In some embodiments, the user interface 1002 includes a password activatable icon 1006 and a new customer activatable icon 1008. In response to receiving a user selection of the password activatable icon 1006, a prompt, generated by the notification generation circuit 214, to enter a password for customer authentication may be displayed. Upon selection of the new customer activatable icon 1008, the notification generation circuit 214 may generate and display a new user interface requesting the user to fill out information to create an account (e.g., a provider account associated with the provider).

The user interface 1004 may be displayed on the user device 104 in response to successful authentication and pairing with the smart table 106. In some embodiments, the user interface 1004 includes activatable icons list 1010 for selecting various options regarding accounts of the customer. For example, the activatable icons list 1010 may include options to view information pertaining to a checking account, a savings account, a debit card, a credit card, and/or foreign exchange. The user interface 1004 may also include a cancel activatable option 1012. In some embodiments, in response to selection of the cancel activatable option 1012, the provider session ends and the established connection between the smart table 106 and the one or more paired user devices 104 ends. In some embodiments, the user device 104 may return to a home page of the user client application 132 in response to receiving a selection of the cancel activatable option 1012.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

Figure 11:
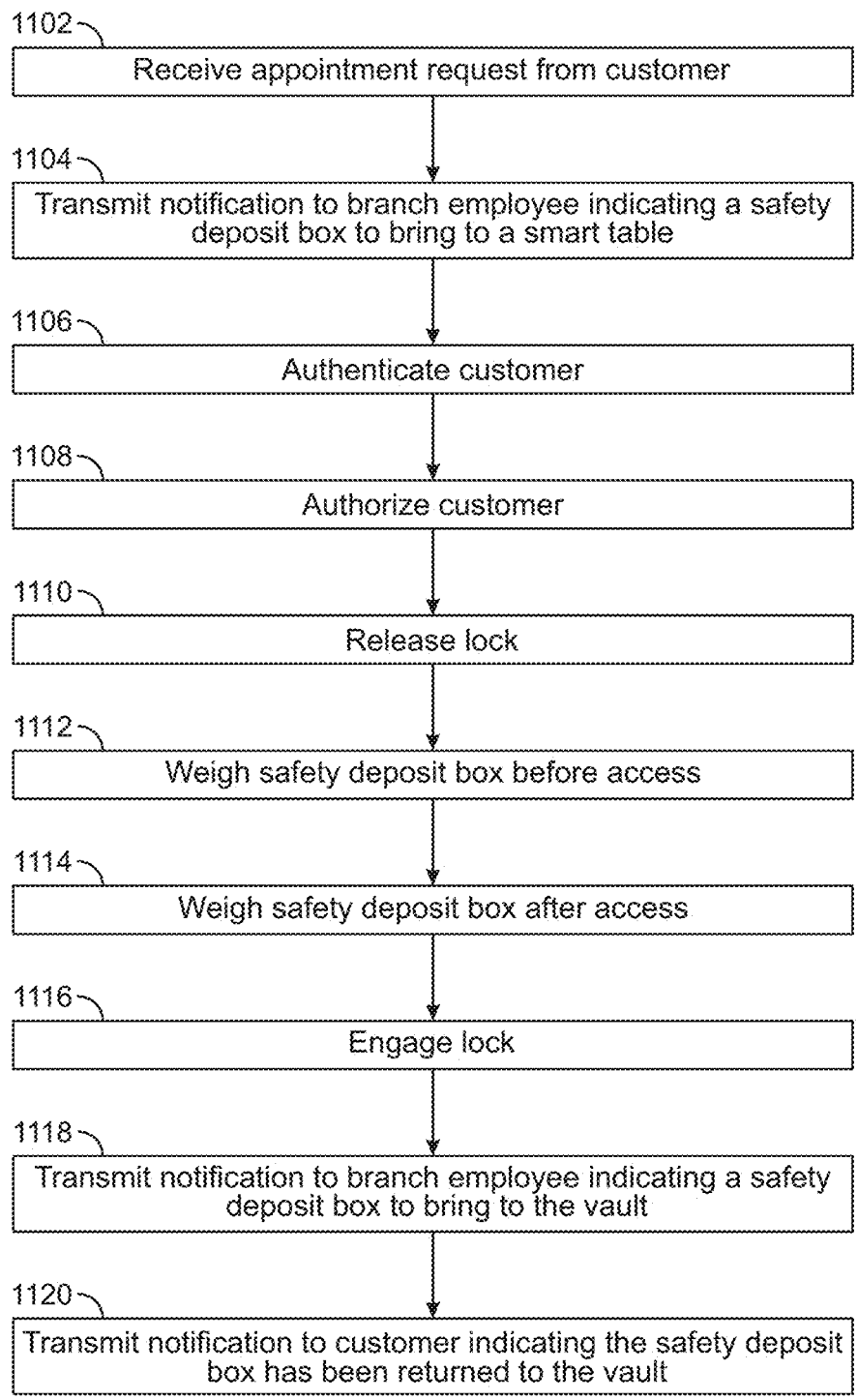
FIG. 11 is flow diagram of a method for a safety deposit box access system, according to example embodiments.

Referring now to FIG. 11, a flow diagram of a method for a safety deposit box access system is shown, according to some embodiments. The method 1100 may be provided by and/or accessible by the provider client application 120, the branch client application 150, the user client application 132, and/or the smart table client application 218. In some instances, the method 1100 may be performed by the smart table system 100 described above pertaining to FIGS. 1 and 2, or any other figure. The method 1100 may be initiated by a customer scheduling an appointment to access the customer's safety deposit box using the user client application 132 of the customer's user device 104, at step 1102. In some embodiments, the customer may use voice commands to schedule an appointment through the user client application 132 of the user device 104. In some embodiments, the branch employee may schedule an appointment for the customer after receiving instructions directly from the customer (e.g., via a phone call to the branch).

At step 1104, the branch employee may receive a notification transmitted by the user device 104 for a requested appointment to access a safety deposit box. In some embodiments, the notification can include instructions for the branch employee to preload or stage the lockers 1304 prior to a customer appointment. In some embodiments, the branch employee may receive a notification by an artificial reality (AR) headset. The notification may include the time and date of the appointment, as well as an identifier of the safety deposit box and the locker identifier 1502 where the safety deposit box is to be transferred to. If the branch employee deposits the safety deposit box in the wrong locker (e.g., locker 3 instead of locker 4), the employee will receive a notification to deposit the safety deposit box in the correct locker 1304. A notification or alert may be escalated to a manager if the employee does not place the box in the correct locker 1304 within a certain amount of time from the customer's scheduled appointment. Alternatively, if there are no other scheduled appointments to access the locker 1304 the safety deposit box was mistakenly placed within, an automated notification may be sent to the customer updating the locker location to the locker 1304 the safety deposit box is stored within. In some embodiments, the smart table 106 may keep a record of the dimensions of the safety deposit box of a customer and designate a locker 1304 based on the size of the safety deposit box. For example, a customer may have a safety deposit box that is 10 inches wide, 10 inches tall, and 2 feet deep. In this instance, the safety deposit box may only fit in the largest sized locker 104. Based on this determination, the smart table 106 may assign the safety deposit box to the largest sized locker 104. In another example, the customer may have a safety deposit box with a width of 5 inches, height of 3 inches, and a depth of 1 foot. In this instance, the smart table 106 may assign the safety deposit box to the smallest available locker 1304. In some embodiments, the customer may request that a safety deposit box be transferred to another branch location. For example, a customer may normally live in New York, and may maintain a safety deposit box at a branch in New York, but may be planning to attend an event in Los Angeles where they would like to access some jewelry that they do not want to travel with across the country. In this example, the customer may schedule an appointment to access the safety deposit box at a branch in Los Angeles and the safety deposit box may be safely delivered to that branch by the provider. In another embodiment, a smart table 106 with a locker bay 1302 may be delivered to a desired location of a customer (e.g., customer home, place of business).

In further embodiments, the customer may schedule an appointment to access the safety deposit box outside of branch hours. In some embodiments, the branch may have a smart table 106 with a locker bay 1302 in an area accessible outside of branch hours. In further embodiments, the customer may be authenticated by the user device 104 of the customer prior to entry and be allowed into a specified area of the branch based on customer authorization.

In some embodiments, the notification may include a request for a specific item from the safety deposit box be added to the locker 1304 (e.g., passport, birth certificate). In some embodiments, the smart table 106 may display the schedule with all of the safety deposit access appointments for the day, along with indications of which safety deposit boxes are to be put in which of the built-in lockers 1304 of the smart table 106 with a locker bay 1302. In some embodiments, the branch employee may remove an individual locker 1304 from the smart table 106 with the locker bay 1302 to bring into the vault and fill the appropriate lockers 1304 with entire safety deposit boxes or individual items, as requested by the customer.

In some embodiments, the customer may receive a notification through the user client application 132 of the user device 104 to inform the customer that the safety deposit box has been transferred to the smart table 106 with the locker bay 1302. In some embodiments, the notification may include the locker identifier 1502 where the safety deposit box or item will be held, a photo of the safety deposit box or item inside the locker 1304, and the weight of the safety deposit box or item. In further embodiments, the smart table 106 may be able to be moved (e.g., wheeled or slid) entirely into the vault to enable loading of the lockers 1304 without leaving the vault. In other embodiments, the smart table 106 with a locker bay 1302 may be situated on the outside of the vault allowing for a simple transfer of a safety deposit box or items through a wall of the vault and loaded into the lockers 1304. In further embodiments, the locker bay 1302 may be situated between the wall of the vault and a customer accessible area. In this instance, the lockers 1304 in the locker bay 1302 may be accessible both from inside the vault by the branch employees and from the customer accessible area by the customer.

At step 1106, the method 1100 may authenticate the customer. In some embodiments, the customer may be authenticated by providing a registered smart device (e.g., the user device 104) that requires authentication to access (e.g., passcode, password, biometric screen). In further embodiments, the customer may be authenticated by providing a payment card (e.g., ATM card, debit card, etc.) and an associated PIN. In some embodiments, the customer may be authenticated using a smart card having authentication capabilities. In some embodiments, the customer may be authenticated by scanning a key for the safety deposit box (e.g., mechanical key, key FOB, RFID key) along with presenting a form of identification (e.g., ID card, passport). In some embodiments, the customer may be authenticated only when a branch employee is present. In further embodiments, the customer may be authenticated without a branch employee present. In some embodiments, when the customer arrives at the branch location, the customer may scan a key or a payment card, smart card, etc. at a smart table 106 and be directed to a designated locker bay 1302 or a particular locker 1304. In further embodiments, the customer may scan the key, payment card, smart card, etc. at a device connected to the smart table 106 and may be directed to the correct locker bay 1302 or particular locker 1304. In some embodiments the customer may be directed to a smart table 106 that does not have a locker bay 1302 that may be paired to a smart table 106 that does have a bay of lockers. In this instance, the customer may complete steps 1106 and 1108, as described below, at the smart table 106 without the locker bay 1302 and then a branch employee may retrieve a designated locker 1304 from the smart table 106 with the locker bay 1302 to complete the method 1100.

At step 1108, the method 1100 may authorize the customer to access a particular safety deposit box, a group of safety deposit boxes, a particular compartment of a compartmentalized safety deposit box, or an item from a safety deposit box. In some embodiments, the customer may be authorized at step 1108 of method 1100 (e.g., the user presents a safety deposit box key and a form of identification). In particular embodiments, the customer must be authorized under specific rules for accessing the safety deposit box (e.g., two people necessary, written consent). In some embodiments, the customer may be authorized by presenting a registered smart device, presenting a key, a biometric screen, etc. In some embodiments, the customer may be authorized only when a branch employee is present. In some embodiments, the customer may be authorized only when another customer is present (e.g., joint safety deposit box account). In further embodiments, the customer may be authorized without a branch employee present. In some embodiments, the customer may be designated as a "secondary" in a joint account by the "primary" owner and thus, only have partial access to the safety deposit box (e.g., only particular items from the safety deposit box). In this instance, particular items may be separated from the safety deposit box and added to a sub-compartment of the locker 1304 that requires further authorization (e.g., biometric screen if not previously required). In some embodiments, the safety deposit box itself may have tiered authorization for all account owners (e.g., in addition to or alternative to the locker 1304 having different sub-compartments), thus the customer may only have partial access to the safety deposit box (i.e., only particular items from the safety deposit box). In this instance particular items may be separated from the safety deposit box and added to a sub-compartment of the locker 1304 that requires a higher level of authorization.

At step 1110, the method 1100 may release the lock of the designated locker 1304 when the customer has been authenticated and authorized to access the contents. In some embodiments, the smart table 106 may be directly connected to the locker 1304 or connected via a network, Bluetooth™, NFC, etc. and can be unlocked by the smart table 106. In further embodiments, the locker 1304 may present an obstruction to the lock of the safety deposit box or locker 1304 and, upon authentication and authorization, the obstruction may be removed allowing the customer to access the contents. In some embodiments, the obstruction may be physical (e.g., a cover to a lock, closed door over locker) or a communication obstruction (e.g., removing communication from electronic PIN pad, disabling RFID sensor).

At step 1112, the method 1100 may weigh the safety deposit box. In some embodiments, the smart table 106 prompts the user to weigh the safety deposit box on the surface of the smart table 106, using a connected device, or using a weight measurement device within the locker 1304 prior to accessing the contents of the safety deposit box. For example, in some embodiments, step 1112 may take place prior to releasing the lock at step 1110, where the weight sensor is contained within the compartment 1402 of the locker 1304.

In some embodiments, the smart table 106 may add the measured weight of the safety deposit box to a list of previous weights to create an audit trail. In some embodiments the audit trail may be created to ensure no items are lost or stolen when in the possession of the financial institution. In further embodiments, weights of the safety deposit box may be taken before and after customer access to determine if items were deposited or withdrawn. Additionally, if a customer deposits a new item or removes an existing item from the safety deposit box, the customer may receive a notification by the user device 104 to confirm a new weight as a "default weight" of the safety deposit box.

In some embodiments, the customer and/or the branch employee may be notified either by the smart table 106 or a user device 104 that there is an upcoming appointment (e.g., in 1 minute, 5 minutes, 15 minutes) to access items from a locker 1304 of the smart table 106. In some embodiments, the smart table 106 may display a timer indicating the amount of time left in the allotted appointment. In further embodiments, the smart table 106 may display options of future available time slots for the customer to reserve in the case that the allotted amount of time is insufficient.

At step 1114, the method 1100 may include weighing the safety deposit box. In some embodiments, the smart table 106 may prompt the customer using the notification generation circuit 214 to weigh the safety deposit box on the smart table 106 prior to returning the safety deposit box to the locker 1304. In another embodiment, the smart table 106 may prompt the user to weigh the safety deposit box on a connected device prior to returning the safety deposit box to the locker 1304. In further embodiments, step 1114 may occur after step 1116, where the weight sensor is contained within the compartment 1402 of the locker 1304. In some embodiments, the smart table 106 may add the measured weight of the safety deposit box to the list of previous weights to continue to create or otherwise update the audit trail. In some embodiments the audit trail may be created to ensure no items are lost or stolen when in the possession of the financial institution. In some embodiments, weights of the safety deposit box may be taken before and after customer access to determine if items were deposited or withdrawn.

At step 1116, the method 1100 may include engaging the lock of the designated locker 1304 by prompting the locking mechanism 1406 to engage. The locking mechanism 1406 may be engaged by an electric motor (e.g., a servo), a solenoid, etc. In some embodiments, the locker 1304 may determine when to lock the locker 1304 by recognizing the additional weight and determining that the locker door 1404 has been closed. In some embodiments, the smart table 106 may provide a prompt for the customer on the smart table 106 requiring an input verifying that all desired items have been placed inside the locker 1304 and that the locker 1304 may be locked. In further embodiments, the customer may engage the locking mechanism 1406 on the door 1404 of the locker 1304 (e.g., a "lock" button, mechanical lock).

At step 1118, method 1100 may include transmitting a notification to a branch employee indicating that there is a safety deposit box to bring to the vault. In some embodiments the notification may be sent to the user device 104 of the branch employee. In further embodiments, the branch employee may receive a notification on the smart table 106 listing all of the lockers 1304 containing safety deposit boxes that must be brought to the vault. In further embodiments, the branch employee may receive a notification that the safety deposit box in a particular locker 1304 must be returned to the vault, and that a new safety deposit box must be added to the newly-vacant locker 1304. In some embodiments, the lockers 1304 and safety deposit boxes can be tagged. For example, the smart table 106 may keep a record of the particular safety deposit boxes that were in each individual locker 1304 of the locker bay 1302. At the end of the business day, the tagged lockers and safety deposit boxes may be listed so a branch employee can complete the reconciling of the safety deposit boxes.

At step 1120, method 1100 may include transmitting a notification to the customer indicating that the safety deposit box has been returned to the vault. In some embodiments, the notification may be in the form of a push notification provided by the user client application 132, a text message, an email, etc. In some embodiments, the notification is transmitted upon confirmation by the branch employee that the safety deposit box has been returned to the vault. In further embodiments, the notification is transmitted when a sensor in the locker 1304 determines that the locker 1304 has entered the vault. In some embodiments, the sensor may be a GPS location device, a NFC sensor, a Bluetooth™ sensor, etc.

Figure 12:
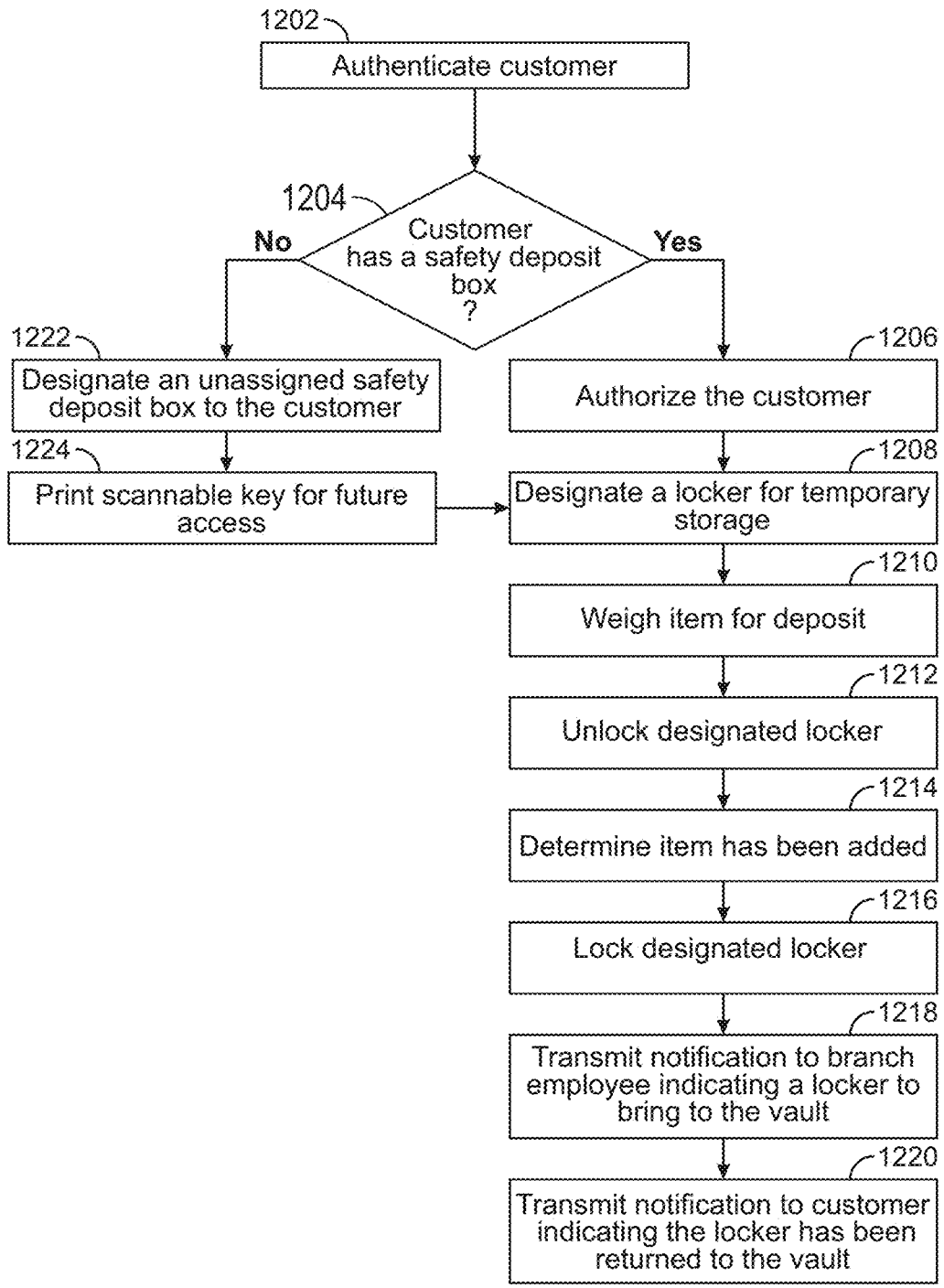
FIG. 12 is a flow diagram of a method for a safety deposit box deposit system, according to example embodiments.

Referring now to FIG. 12, a flow diagram of a method for a safety deposit box deposit system is shown, according to some embodiments. The method 1200 may be provided by and/or accessible by the provider client application 120, the branch client application 150, the user client application 132, and/or the smart table client application 218. In some embodiments, the method 1200 begins in response to receiving, by a smart table 106, a session trigger event. A session trigger event may be any event that triggers the beginning of a session between the smart table 106 and a user device 104. In some instances, the session trigger event may be proximity-based. For example, when a customer is within a certain proximity of the smart table 106, the user device 104 associated with the customer that the customer is holding may be within a wireless communication range of various devices (e.g., the branch computing system 108 and/or the smart table 106) associated with the branch location. In response to entering the wireless communication range, the respective user device 104 may be configured to automatically request for the customer to enter confirmation and/or authentication information, via the user device 104, to establish a secure connection with the smart table 106. As such, the security of the provider session may increase, as a customer may be required to be within a certain proximity (e.g., a predetermined distance) of the smart table 106 to begin the provider session. In some instances, in addition to or in place of the wireless communication range, the proximity of the user device 104 to the smart table 106 may be determined using GPS-based locational data obtained from each of the user device 104 and the smart table 106. In some embodiments, similarly, a user device 104 of an employee scheduled to be running a provider session for the smart table 106 may also be required to be within proximity of the smart table 106 in order to initiate the provider session.

A session trigger event may additionally or alternatively include receiving an input via input/output device 220, such as receiving a user interaction via a touch screen display of the smart table 106. In some embodiments, the smart table 106 may be configured to operate in a low power mode or "sleep mode" until a session trigger event is received. In some embodiments, the customer may request to make an item deposit by interacting with the smart table 106 or a user device 104.

At step 1202, method 1200 may include authenticating the customer. The authentication of the customer at step 1202 is substantially similar to step 1106 of method 1100. Accordingly, the smart table 106 may authenticate the identity of the customer requesting to make an item deposit. At step 1204, method 1200 may include determining whether the customer currently has a safety deposit box with the financial institution. In some embodiments, the identity of the customer may be searched in the customer account database 118 to determine if the customer has a safety deposit box with the financial institution. If the customer does have a safety deposit box with the financial institution, the method proceeds to step 1206. If the customer does not have a safety deposit box with the financial institution, the method proceeds to step 1222. In some embodiments, if the customer has a safety deposit box with the financial institution but at a separate branch, the method may proceed to step 1222 to assign a safety deposit box at the current location.

At step 1206, method 1200 may include authorizing the customer to add one or more items to a safety deposit box. The authorization of the customer at step 1206 is substantially similar to step 1108 of the method 1100. Accordingly the smart table 106 may authorize the customer to deposit one or more items in a safety deposit box. At step 1208 of method 1200 the smart table 106 with the built-in locker bay 1302 may designate a locker 1304 for temporary storage of an item for deposit. In some embodiments, the locker management circuit 215 may keep a record of which lockers 1304 are reserved by other customers, or currently filled. In further embodiments, the smart table 106 with the built-in locker bay 1302 may use weight sensors in the compartments 1402 of individual lockers 1304 to determine which lockers 1304 are available for deposits.

At step 1210 of method 1200, the smart table 106 with the built-in locker bay 1302 may weigh the item for deposit. In some embodiments, the smart table 106 may prompt the customer to place the item for deposit on the surface of the smart table to measure the weight. In further embodiments, where the locker 1304 contains a weight sensor within the compartment 1402 of the locker 1304, step 1210 may occur after step 1216. In further embodiments, the smart table 106 may prompt the user to place the item for deposit on a connected device to measure the weight.

At step 1212, method 1200 may include unlocking the designated locker 1304. In some embodiments, the smart table 106 may be directly connected to the locker 1304 or connected via a network, Bluetooth™, NFC, etc. and is configured to selectively unlocked the locker 1304. In further embodiments, the locker 1304 may present an obstruction to the lock of the safety deposit box or locker 1304 and, upon authentication and authorization, the obstruction is removed allowing the customer to access the contents. In some embodiments, the obstruction may be physical (e.g., a cover to a lock, lowered door over locker) or a communication obstruction (e.g., removing communication from electronic PIN pad, disabling RFID sensor).

At step 1214, method 1200 may include determining that an item has been added to the locker 1304. In some embodiments, this determination may be performed by sensing a weight in the compartment 1402 of the locker 1304. In some embodiments, a camera 1602 in the compartment 1402 of the locker 1304 can be used to determine when an item has been added to the locker 1304. At step 1216, method 1200 may include locking the designated locker 1304. In some embodiments, the smart table 106 may provide a prompt for the customer on the smart table 106 requiring an input verifying that all desired items have been placed inside the locker 1304 and that the locker 1304 may be locked. In further embodiments, the customer may engage the lock on the door 1404 of the locker 1304 (e.g., a "lock" button, mechanical lock).

At step 1218, method 1200 may include transmitting a notification to a branch employee indicating a locker 1304 or the contents of a locker 1304 must be brought to the vault. In some embodiments the notification may be sent to the user device 104 of the branch employee. In further embodiments, the branch employee may receive a notification on the smart table 106 listing all of the lockers 1304 containing safety deposit boxes or items for deposit that must be brought to the vault. In further embodiments, the branch employee may receive a notification that the safety deposit box in a particular locker 1304 must be returned to the vault, and that a new safety deposit box must be added to the newly-vacant locker 1304. In some embodiments, the branch employee may bring an individual item from the locker 1304 to the vault to be added to a safety deposit box. In further embodiments, the branch employee may bring an individual locker 1304 or the entire smart table 106 with the built-in locker bay 1302 into the vault to transfer the items from the lockers 1304 to safety deposit boxes. If the safety deposit box was deposited in the wrong locker (e.g., locker 3 instead of locker 4), the employee will receive a notification to deposit the safety deposit box in the correct locker 1304. A notification or alert may be escalated to a manager if the employee does not place the box in the correct locker 1304 within a certain amount of time from the customer's scheduled appointment.

At step 1220, method 1200 may include transmitting a notification to a customer indicating the locker 1304 or items within the locker 1304 have been returned to the vault. In some embodiments, the notification may be in the form of a push notification provided by the user client application 132, a text message, an email, etc. In some embodiments, the notification is transmitted upon confirmation by the branch employee that the item or safety deposit box has been returned to the vault. In further embodiments, the notification is transmitted when a sensor in the locker 1304 determines that the locker 1304 has entered the vault. In some embodiments, the sensor may be a GPS location device, a NFC sensor, a Bluetooth™ sensor, etc.

In some embodiments, the customer may not have a safety deposit box with the financial institution, or at the particular branch of the financial institution. In these instances, method 1200 may include designating an unassigned safety deposit box to the customer, at step 1222. In some embodiments, the locker management circuit 215 manages and determines which safety deposit boxes are assigned to a customer or not. In further embodiments, the provider computing system 102 or the branch computing system 108 manages and determines which safety deposit boxes are assigned to a customer and provides an unassigned safety deposit box to the smart table 106 when requested. In further embodiments, the item(s) are held within the locker 1304 and a branch employee determines which safety deposit box is available for deposit.

At step 1224, method 1200 may print a scannable key for future access to the newly-assigned safety deposit box. In some embodiments, the card printing circuit 217 prints a card that allows the user to access the newly-assigned safety deposit box in the future. In further embodiments, the customer account database 118 updates the customer account data to allow the customer to use a current payment card to access the newly-assigned safety deposit box. In some embodiments, the customer is provided with a physical key to access the newly-assigned safety deposit box. In some embodiments, the card printing circuit 217 may print temporary, permanent, or replacement cards that allow a user to access a safety deposit box and act as a form of authentication.

Figure 13:
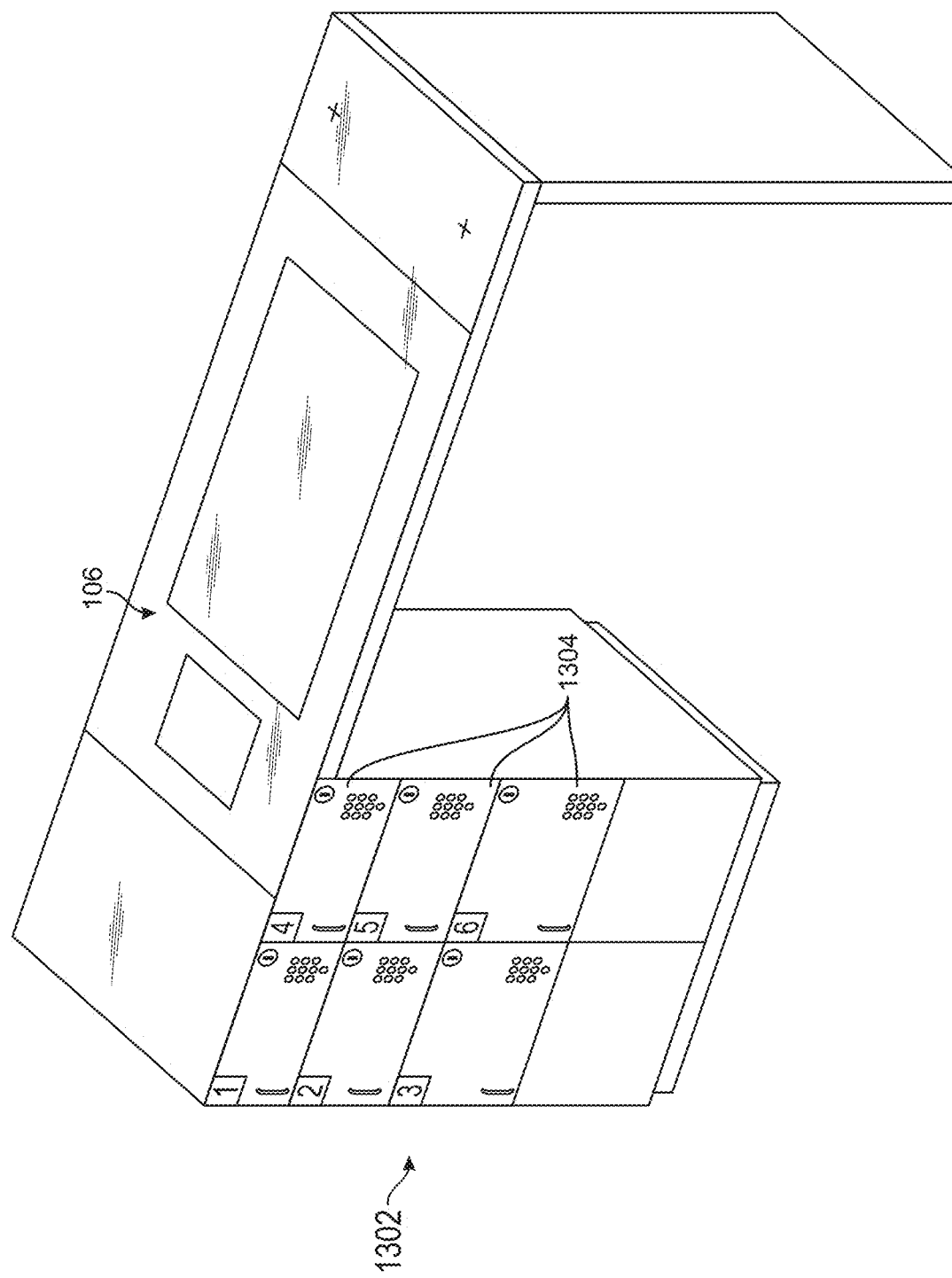
FIG. 13 is an illustration of a smart table with built-in lockers, according to example embodiments.

Referring now to FIG. 13, an illustration of a smart table 106 with a built-in locker bay 1302 is shown, according to some embodiments. The smart table 106 with built-in locker bay 1302, in some embodiments, comprises a smart table 106 and a locker bay 1302 which holds a plurality of lockers 1304. In some embodiments, the lockers 1304 are all of the same size. In further embodiments, the lockers 1304 are of different sizes to accommodate varying sizes of safety deposit boxes, or items. In some embodiments, the smart table 106 may keep a record of the dimensions of the safety deposit box of a customer and designate a locker 1304 based on the size of the safety deposit box. For example, a customer may have a safety deposit box that is 10 inches wide, 10 inches tall, and 2 feet deep. In this instance, the safety deposit box may only fit in the largest sized locker 104. Based on this determination, the smart table 106 may assign the safety deposit box to the largest sized locker 104. In another example, the customer may have a safety deposit box with a width of 5 inches, height of 3 inches, and a depth of 1 foot. In this instance, the smart table 106 may assign the safety deposit box to the smallest available locker 1304. In some embodiments, the locker bay 1302 may hold one or more lockers 1304 that may be replaced prior to each customer access.

In some embodiments, individual lockers 1304 may be able to be removed from the smart table 106 with the built-in locker bay 1302 individually. In a particular embodiment, a user may request to access a safety deposit box after the branch has opened. The branch employee may remove an individual locker 1304 from the smart table 106 with the built-in locker bay 1302, bring it to the vault to safely add an item or safety deposit box to the locker 1304, and return it to the smart table 106 with built-in locker bay 1302.

In further embodiments, the locker bay 1302 may be able to be removed from the smart table 106 with built-in locker bay 1302. For example, before the opening of the branch, the user device 104 of the branch employee may be notified of a number of customers who have scheduled appointments to access their safety deposit boxes. The branch employee may separate the locker bay 1302 from the smart table 106 and transport it to the vault to add safety deposit boxes or items to the individual lockers 1304.

In some embodiments, the locker bay 1302 is physically separated from the smart table 106, but communicably coupled to the smart table 106. Instead of a small group of lockers connected to the smart table 106, the locker bay 1302 be located in a central location to a plurality of smart tables 106. For example, the locker bay 1302 may be located in the center of an open room with a plurality of smart tables arranged surrounding the locker bay 1302. This may enable a customer to be authenticated and authorized to access a particular locker 1304 at any of the number of smart tables 106.

Figure 14:
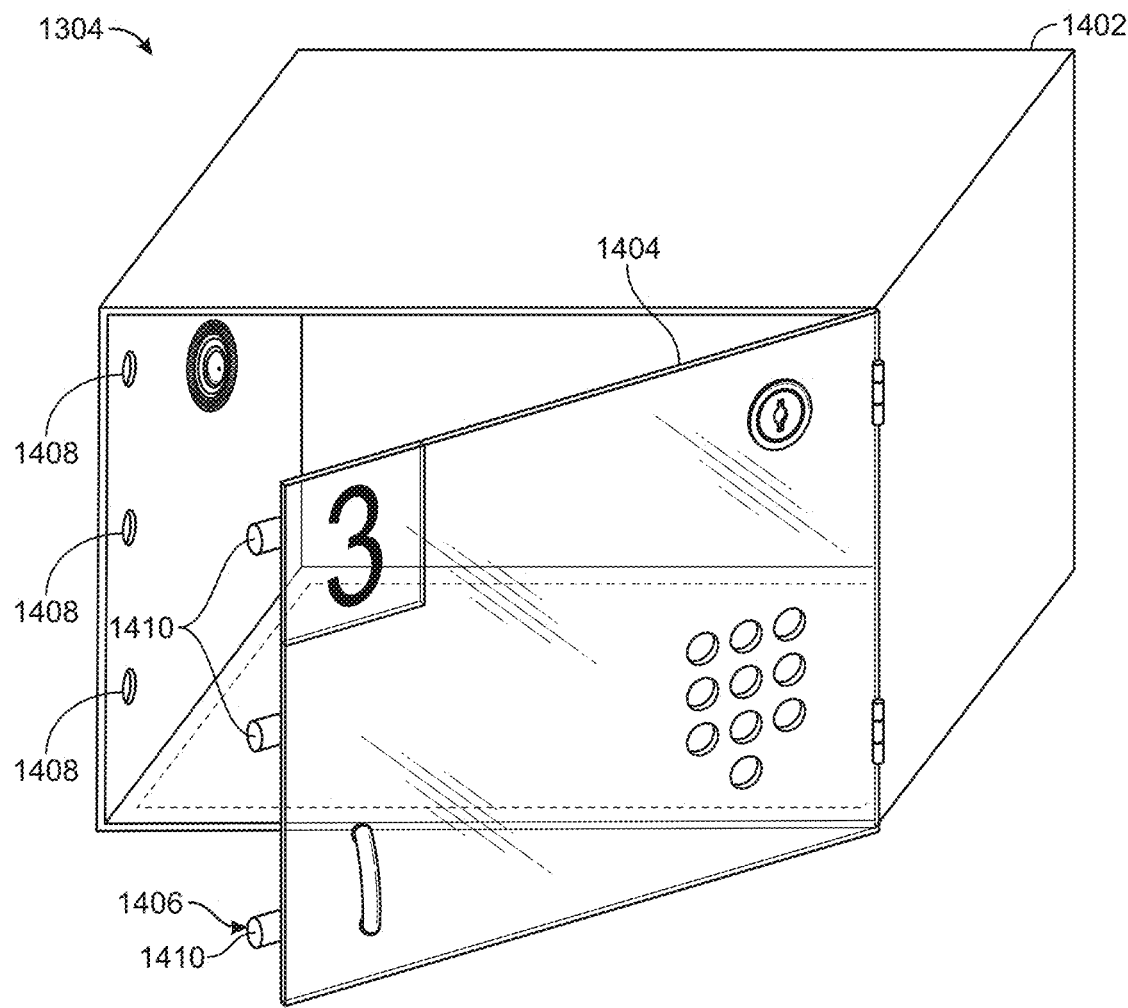
FIG. 14 is an illustration of a locker, according to example embodiments.

Referring now to FIG. 14, an illustration of a locker 1304 is shown, according to example embodiments. In some embodiments, the locker 1304 comprises a compartment 1402, a locker door 1404, and a locking mechanism 1406 which may include recessions 1408 where dead bolts (or actuatable pins) 1410 may be inserted. In some embodiments, the locker 1304 may be simply added or removed from the locker bay 1302 (e.g., via a releasable latch). In further embodiments, the locker 1304 may be fixed to the locker bay 1302. In some embodiments, the locker 1304 may contain a GPS location device. The GPS location device may be used to track where the locker 1304 is located within the branch (e.g., in the smart table 106, in the vault) and/or where the locker 1304 is located outside of the branch (e.g., in transit to branch, at another branch). In some embodiments the locker 1304 may contain sensors that interact with sensors or signals within the vault to indicate when the locker 1304 has entered the vault (e.g., Bluetooth™ sensor, NFC sensor, Infrared sensor). In some embodiments, the compartment 1402 may contain multiple sub-compartments. The sub-compartments may allow a customer or set of customers to have tiered access to the contents of the locker 1304. For example, a mother and son may wish to access the safety deposit box on the same day (or different days) at separate times. In this instance, the mother may specify that the son may not access certain items of the safety deposit box (e.g., jewelry, passport) and the certain items the son may not access could be stored in a sub-compartment of the locker 1304 that only the mother is authorized to access.

Figure 15:
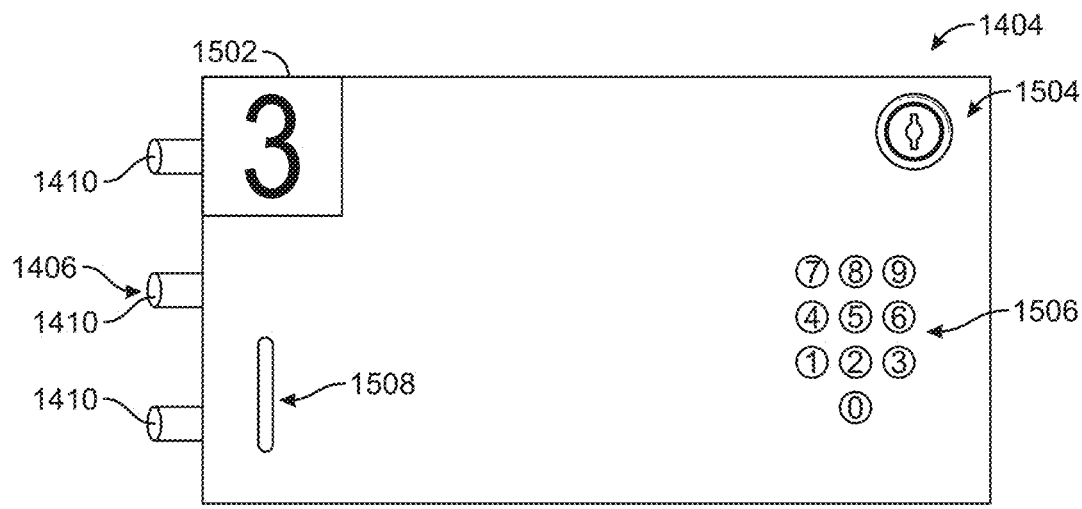
FIG. 15 is an illustration of a door of a locker, according to example embodiments.

Referring now to FIG. 15, an illustration of a locker door 1404 is shown, according to example embodiments. In some embodiments, the locker door 1404 may comprise a locking mechanism (also referred to as lock) 1406 which may include deadbolts 1410, a locker identifier 1502, a keyed lock 1504, a PIN pad 1506, and a handle 1508. In some embodiments, the locker door 1404 may swing on a hinge. In other embodiments, the locker door 1404 may be a retractable door (i.e., garage door). In further embodiments, the locker 1304 may not comprise a locker door 1404 and a safety deposit box disposed within the locker 1304 may act as the locker door 1404.

The locking mechanism 1406 may be any suitable locking mechanism (e.g., dead bolt, latching locks). In some embodiments, the locking mechanism 1406 may only be engaged or disengaged by the smart table 106. In further embodiments, the locking mechanism 1406 may be engaged or disengaged by a by a master key used in the keyed lock 1504, or a master PIN entered in the PIN pad 1506. In some embodiments, the locking mechanism 1406 may only be disengaged using the keyed lock 1504 or the PIN pad 1506 under certain circumstances, for example, outside of branch hours, or when the locker 1304 is determined to be within the vault. In any case, the locking mechanism 1406 may be selectively actuatable to mechanically lock the locker door 1404 in a closed position when it is engaged, thereby locking any items or safety deposit boxes placed therein within the locker 1304.

Still referring to FIG. 15, each locker 1304 may be assigned a locker identifier 1502. In some embodiments, the locker identifier 1502 may be any assortment of alpha-numeric values (e.g., 3, 5B, A2, 3B4, C3 S, L). In some embodiments, the locker identifier 1502 may relate to the size of the locker 1304 if there are different sizes, or to which smart table 106 with the built-in locker bay 1302 the locker 1304 is assigned to, for example a locker identifier 1502 may be 3B4 indicating it is the third locker of size B at smart table 4.

Figure 16:
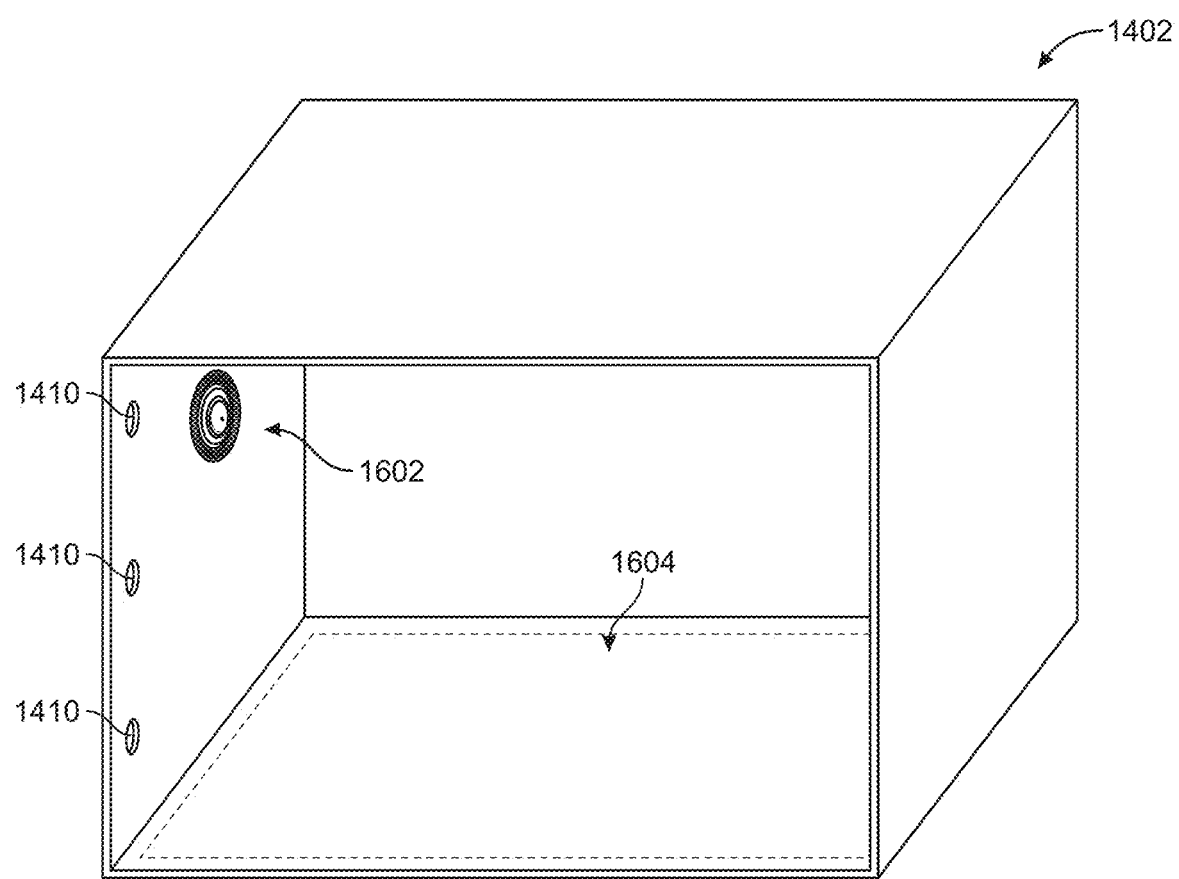
FIG. 16 is an illustration of a compartment of a locker, according to example embodiments.

Referring now to FIG. 16, an illustration of a compartment 1402 is shown, according to example embodiments. The compartment 1402 may comprise various recesses (or apertures) 1408 for receiving corresponding actuatable pins 1410, together creating the locking mechanism 1406, a camera 1602, and a weight sensor 1604. In some embodiments, the compartment 1402 may not include a camera 1602 or a weight sensor 1604. In some embodiments, the data collected by the camera 1602 and the weight sensor 1604 may be immediately transmitted to the smart table 106, branch computing system 108, user device 104 and/or the provider computing system 102 by a wired or wireless connection (e.g., network connection, Bluetooth™ connection, NFC). In some embodiments, the data collected by the camera 1602 and the weight sensor 1604 may be stored in local memory and later transmitted to the smart table 106, branch computing system 108, user device 104 and/or the provider computing system 102 through a connection with the smart table 106 or other connected device.

The camera 1602 may be configured to collect images and/or video. In some embodiments, the camera 1602 may comprise a light source configured to enable images and/or videos to be taken of the item or safety deposit box stored inside the locker 1304 while the locker 1304 is closed. In some embodiments, a live feed from the camera 1602 may be provided to the user device 104 of the customer to allow the user to view the item or safety deposit box and ensure it is secure. Alternatively, or additionally, the camera 1602 may provide an image of the items, before and/or after the customer has accessed the locker 1304/safety deposit box, to the user device 104. In some embodiments, the camera 1602 may begin recording a video or takes an image when movement is sensed (e.g., similar to a hunting camera), when a change in weight is sensed by the weight sensor 1604, and/or when the locker door 1404 is opened or closed.

The weight sensor 1604 may be any sensor that allows for the measurement of weight in the compartment 1402 (e.g., load cell, strain gauge, haptic feedback sensor). In some embodiments, the weight sensor 1604 may record weight when indicated by the smart table 106. In further embodiments, the weight sensor 1604 may continuously measure weight inside the compartment 1402 and trigger the camera 1602 and/or the smart table 106 when the weight changes. In some embodiments, the weight sensor 1604 may further be configured to sense movement of the locker 1304.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A safety deposit box access system associated with a provider, the safety deposit box access system comprising:
    a locker comprising:
        a compartment configured to receive contents;
        a door coupled to the compartment and configured to contain the contents within the compartment, the door being openable to allow access to the compartment;
        a lock selectively actuatable between a locked position to prevent the door from opening and an unlocked position to allow the door to open; and
    a smart table communicably coupled to the locker and comprising a network interface and a processing circuit, the network interface configured to facilitate data communication with a plurality of user devices via a network, the processing circuit comprising a processor and a memory, the processing circuit configured to:
        receive an appointment request from a customer user device including a time of a requested appointment, a location of the requested appointment, and a safety deposit box to be accessed by a customer associated with the customer user device during the requested appointment;
        authenticate the customer during the requested appointment;
        verify that the customer is authorized to access the safety deposit box stored in the compartment of the locker based on the customer being authenticated;
        actuate the lock of the locker to the unlocked position based on the customer being authorized to access the safety deposit box in the compartment of the locker;
        actuate the lock of the locker after the safety deposit box is returned to the compartment of the locker; and
        transmit a notification to the customer user device based on the safety deposit box being returned to a vault.

2. The system of claim 1, wherein the compartment of the locker further comprises a weight sensor and a camera.

3. The system of claim 2, wherein the weight sensor is configured to automatically weight the safety deposit box prior to the locker door opening for customer access and after the safety deposit box is returned to the compartment.

4. The system of claim 1, wherein the processing circuit is further configured to:
    notify an employee user device when the customer user device is determined to be within a predefined distance of a provider location associated with the requested appointment.

5. The system of claim 1, wherein the customer is authenticated based on at least one of a biometric screen, presenting a payment card and entering a corresponding PIN, or by scanning a key to the safety deposit box.

6. The system of claim 1, wherein the processing circuit is further configured to:
    prompt the customer to weigh the safety deposit box on the smart table prior to opening the safety deposit box and prior to returning the safety deposit box to the compartment.

7. The system of claim 1, wherein the locker is one of a plurality of lockers, the plurality of lockers including two sizes of lockers.

8. The system of claim 1, wherein the processing circuit is further configured to:
    monitor a location of the safety deposit box based on location data received from a location tracking mechanism of the safety deposit box.

9. The system of claim 1, wherein the compartment comprises a sub-compartment that requires a tiered level of authorization to access.

10. A system comprising:
a plurality of lockers, each locker of the plurality of lockers comprising:
  a compartment configured to receive contents;
  a door coupled to the compartment and configured to contain the contents within the compartment, the door being openable to allow access to the compartment;
  a lock selectively actuatable between a locked position to prevent the door from opening and an unlocked position to allow the door to open; and
a smart table communicably coupled to the plurality of lockers and comprising a network interface and a processing circuit, the network interface configured to facilitate data communication with a plurality of user devices via a network, the processing circuit comprising a processor and a memory, the processing circuit configured to:
  receive an appointment request from a customer user device of a customer including a time of a requested appointment, a location of the requested appointment, and an indication of an item for deposit into a vault;
  authenticate the customer during the requested appointment;
  identify a locker from the plurality of lockers for the customer to temporarily store the item for deposit based on the appointment request;
  actuate the lock of the locker to the unlocked position;
  determine that the item has been placed into the compartment of the locker and the door has been closed;
  actuate the lock of the locker to the locked position based on determining that the door has been closed; and
  transmit a notification to an employee user device to notify an employee associated with the employee user device that the locker is ready to be transferred to the vault.

11. The system of claim 10, wherein the compartment further comprises a weight sensor and a camera.

12. The system of claim 10, wherein the processing circuit is further configured to:
  assign the locker to the customer; and
  verify that the customer is authorized to access the locker based on the customer being authenticated.

13. The system of claim 10, wherein the indication of the item for deposit includes a size of the item for deposit, the processing circuit is further configured to:
  assign the locker to the customer based on one of an availability of the locker and the size of the item for deposit; and
  print a scannable key configured to be used by the customer to access the locker.

14. The system of claim 10, wherein the customer is authenticated based on at least one of a biometric screen, presenting a payment card and entering a corresponding PIN, or by scanning a key to a safety deposit box.

15. The system of claim 10, wherein the processing circuit is further configured to:
  notify the employee user device when the customer user device is determined to be within a predefined distance of a provider location associated with the requested appointment.

16. A smart table comprising:
a touchscreen;
a plurality of interactive surface sensors;
a network interface configured to facilitate data communication with a plurality of user devices via a network;
a plurality of lockers, each locker of the plurality of lockers comprising:
  a compartment configured to receive contents;
  a door coupled to the compartment and configured to contain the contents within the compartment, the door being openable to allow access to the compartment; and
  a lock selectively actuatable between a locked position to prevent the door from opening and an unlocked position to allow the door to open; and
a processing circuit comprising a processor and a memory, the processing circuit configured to:
  receive an appointment request from a customer user device including a time of a requested appointment, a location of the requested appointment, and a safety deposit box to be accessed by a customer associated with the customer user device during the requested appointment;
  identify a locker of the plurality of lockers to be used by the customer to access the safety deposit box of the customer;
  authenticate the customer during the requested appointment;
  verify that the customer is authorized to access the safety deposit box stored in the compartment of the locker based on the customer being authenticated;
  actuate the lock of the locker to the unlocked position to provide the customer access to the locker based on the customer being authorized to access the safety deposit box in the compartment of the locker;
  actuate the lock of the locker after the safety deposit box is returned to the compartment of the locker; and
  transmit a notification to the customer user device based on the safety deposit box being returned to a vault.

17. The smart table of claim 16, wherein each locker further comprises a location tracking mechanism and the processing circuit is further configured to determine a location of each locker.

18. The smart table of claim 16, wherein the compartment of each locker further comprises a weight sensor and a camera.

19. The smart table of claim 16, wherein the compartment of at least one locker of the plurality of lockers further comprises a sub-compartment that requires a tiered level of authorization to access.

20. The smart table of claim 16, wherein at least one locker of the plurality of lockers is configured to be selectively removed from the smart table and replaced within the smart table.

* * * * *